US011582327B1

(12) United States Patent
Cifuentes de la Paz et al.

(10) Patent No.: US 11,582,327 B1
(45) Date of Patent: Feb. 14, 2023

(54) DYNAMICALLY COORDINATED SERVICE MAINTENANCE OPERATIONS AND ADAPTIVE SERVICE POLLING FOR MICROSERVICES

(71) Applicant: Citrix Systems, Inc., Ft. Lauderdale, FL (US)

(72) Inventors: Jorge Ivan Cifuentes de la Paz, Boca Raton, FL (US); Rodney Gallart Acosta, Pembroke Pines, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/451,712

(22) Filed: Oct. 21, 2021

(51) Int. Cl.
*H04L 67/60* (2022.01)
*H04L 67/10* (2022.01)
*H04L 67/00* (2022.01)
*H04L 67/53* (2022.01)
*H04L 67/564* (2022.01)
*H04L 67/567* (2022.01)

(52) U.S. Cl.
CPC ............. *H04L 67/60* (2022.05); *H04L 67/10* (2013.01); *H04L 67/34* (2013.01); *H04L 67/53* (2022.05); *H04L 67/564* (2022.05); *H04L 67/567* (2022.05)

(58) Field of Classification Search
None
See application file for complete search history.

(56) References Cited

U.S. PATENT DOCUMENTS

| | | |
|---|---|---|
| 8,606,922 B1 | 12/2013 | Greenfield et al. |
| 9,032,400 B1 | 5/2015 | Thomas et al. |
| 9,037,703 B1 | 5/2015 | Wu et al. |
| 9,280,372 B2 | 3/2016 | Allen |
| 9,294,558 B1 | 3/2016 | Vincent et al. |
| 2008/0201459 A1 | 8/2008 | Vul et al. |
| 2012/0254444 A1 | 10/2012 | Harchol-Balter et al. |
| 2014/0108775 A1 | 4/2014 | Kludy et al. |
| 2015/0067171 A1 | 3/2015 | Yum et al. |
| 2015/0348177 A1 | 12/2015 | Craft et al. |
| 2016/0132806 A1 | 5/2016 | To et al. |
| 2017/0063615 A1 | 3/2017 | Yang et al. |
| 2017/0102933 A1* | 4/2017 | Vora ................. H04L 41/12 |
| 2017/0149687 A1 | 5/2017 | Udupi et al. |
| 2017/0199795 A1 | 7/2017 | Allen et al. |

(Continued)

OTHER PUBLICATIONS

"Base band resource distribution under C-Ran" by Yanrong Niu, "International Journal on Smart Sensing & Intelligent Systems" (Mar. 2016).

*Primary Examiner* — June Sison

(57) ABSTRACT

Techniques are provided for a coordinated microservice system including a coordinator and multiple services, which interact with each other. Each of the services can have multiple execution instances, which run independently of each other. In operation, the current status of each instance is evaluated against one or more rules to determine whether the current status changes the topography of the services and updating the topography based on the changes. An execution plan is created for executing a command based on one or more predefined rules and the updated topography, where the execution plan includes one or more steps for executing the command on each instance of the service. The execution plan is executed on each instance of the service in accordance with the one or more predefined rules.

20 Claims, 18 Drawing Sheets

(56) References Cited

U.S. PATENT DOCUMENTS

2018/0262580 A1\* 9/2018 Barton ................ H04L 67/2838
2018/0267830 A1   9/2018 Rivera et al.
2021/0360083 A1\* 11/2021 Duggal .................. H04L 67/34

\* cited by examiner

DYNAMICALLY COORDINATED SERVICE MAINTENANCE OPERATIONS AND ADAPTIVE SERVICE POLLING FOR MICROSERVICES

BACKGROUND

In a distributed computing environment, various services can be deployed across multiple computing platforms to perform specialized operations. In some situations, one or more primary services rely on secondary or tertiary services to perform certain operations. For example, a primary service can include a front-end application that relies on a secondary service for accessing a back-end database. When many such primary services simultaneously access the secondary (or tertiary) service, the secondary (or tertiary) service can become overwhelmed with requests, leading to degraded performance for some or all of the primary services.

SUMMARY

One example provides a method of coordinating execution among multiple instances of a service. The method includes receiving a current status from an instance of the service in a topography; in response to receiving the current status, evaluating the current status against one or more rules to determine whether the current status changes the topography; in response to determining that the current status changes the topography, updating the topography based on the changes; receiving a command to execute a maintenance operation on the service; creating an execution plan for executing the command based on one or more predefined rules and the updated topography, the execution plan including one or more steps for executing the command on each instance of the service; and causing each of the one or more steps in the execution plan to be executed on each instance of the service in accordance with the one or more predefined rules. In some examples, the method includes requesting the current status in response to a timed or periodic signal. In some examples, the method includes requesting the current status in response to a signal indicating that the topography has changed. In some examples, the method includes requesting the current status at a polling frequency according to one or more predefined polling rules. In some examples, the method includes modifying the polling frequency based on the current status. In some examples, the one or more predefined polling rules define a plurality of service states, and each of the service states corresponds to different polling frequencies. In some examples, the command includes one or more of a reboot, a backup, and a software update.

Another example provides a computer program product including one or more non-transitory machine-readable mediums having instructions encoded thereon that when executed by at least one processor cause a process to be carried out. The process includes receiving a current status from an instance of the service in a topography; in response to receiving the current status, evaluating the current status against one or more rules to determine whether the current status changes the topography; in response to determining that the current status changes the topography, updating the topography based on the changes; receiving a command to execute a maintenance operation on the service; creating an execution plan for executing the command based on one or more predefined rules and the updated topography, the execution plan including one or more steps for executing the command on each instance of the service; and causing each of the one or more steps in the execution plan to be executed on each instance of the service in accordance with the one or more predefined rules. In some examples, the process includes requesting the current status in response to a timed or periodic signal. In some examples, the process includes requesting the current status in response to a signal indicating that the topography has changed. In some examples, the process includes requesting the current status at a polling frequency according to one or more predefined polling rules. In some examples, the process includes modifying the polling frequency based on the current status. In some examples, the one or more predefined polling rules define a plurality of service states, and each of the service states corresponds to different polling frequencies. In some examples, the command includes one or more of a reboot, a backup, and a software update.

Yet another example provides a system including a storage and at least one processor operatively coupled to the storage, the at least one processor configured to execute instructions stored in the storage that when executed cause the at least one processor to carry out a process. The process includes receiving a current status from an instance of the service in a topography; in response to receiving the current status, evaluating the current status against one or more rules to determine whether the current status changes the topography; in response to determining that the current status changes the topography, updating the topography based on the changes; receiving a command to execute a maintenance operation on the service; creating an execution plan for executing the command based on one or more predefined rules and the updated topography, the execution plan including one or more steps for executing the command on each instance of the service; and causing each of the one or more steps in the execution plan to be executed on each instance of the service in accordance with the one or more predefined rules. In some examples, the process includes requesting the current status in response to a timed or periodic signal. In some examples, the process includes requesting the current status in response to a signal indicating that the topography has changed. In some examples, the process includes requesting the current status at a polling frequency according to one or more predefined polling rules. In some examples, the process includes modifying the polling frequency based on the current status. In some examples, the one or more predefined polling rules define a plurality of service states, and each of the service states corresponds to different polling frequencies.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
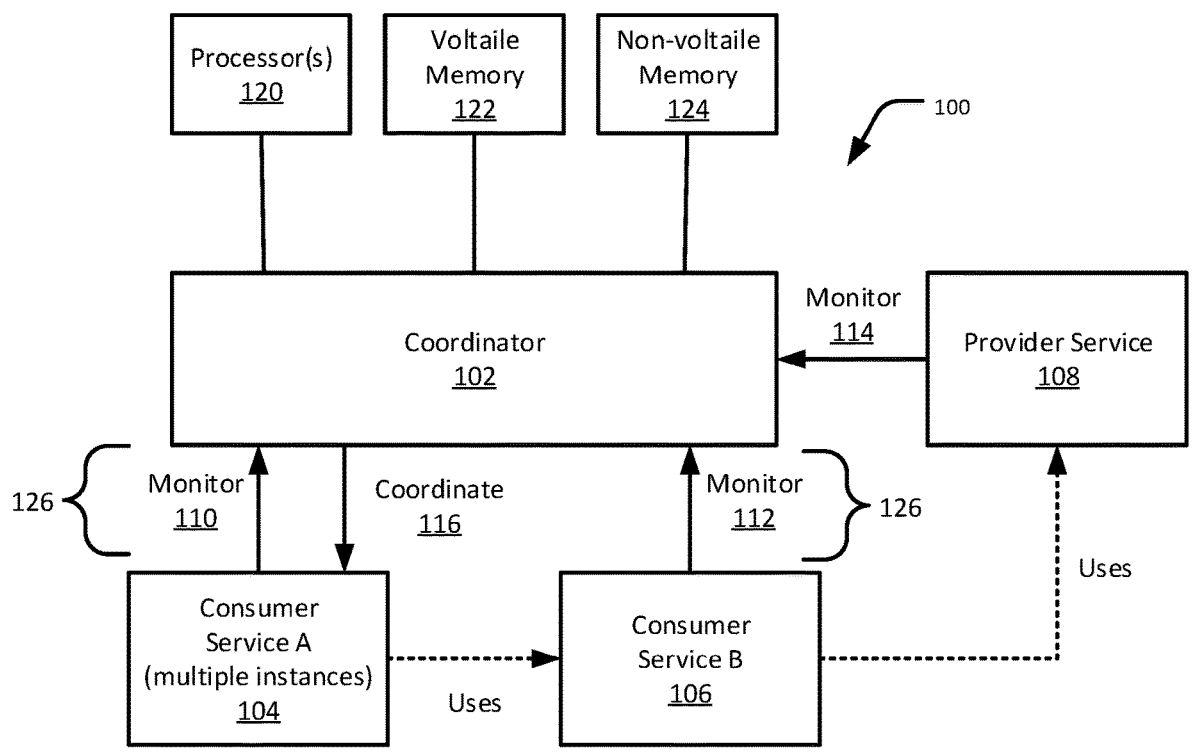
FIG. 1 is a block diagram of a coordinated microservice system, in accordance with an example of the present disclosure.

According to some examples of the present disclosure, a coordinated microservice system includes a coordinator and multiple services (e.g., microservices), which interact with each other. Each of the services can have multiple execution instances, which run independently of each other (e.g., simultaneously) and are not necessarily aware of each other. The services can, for example, access software, perform functions, and enable modularity across a distributed, service-oriented system. In operation, each instance of each service can use, or otherwise depend upon, one or more of the other services to perform at least some of its respective function(s). The coordinator is configured to coordinate execution of multiple instances of a given class of services. For example, there can be several classes of services, e.g., Service A, Service B, Service C, etc., and within each class of services there can be multiple instances of each service. The coordinator monitors execution requests made to each instance of the services in each class and requests from each of the services to other services (e.g., requests from a web application to one of the service instances or another service sending a request to one of the service instances). The coordinator calculates available processing of each service capacity and the capacity of the other services upon which the requesting services depend to execute each of the execution requests based on (i) the monitored performance metrics of the other services and (ii) level(s) of resource consumption associated with each of the execution requests. The coordinator then modifies the capacity of an instance of the service (e.g., increasing or decreasing a limit on the processing capacity of the instance) based on the available capacity of the other instances of the same service and of the other services to service (e.g., execute to completion) the execution requests without degrading or otherwise adversely impacting the services. Further examples will be apparent in view of this disclosure.

Microservices are a type of service that can be deployed in clusters, where several instances of the service are always running. Keeping several instances active can increase performance and availability of the microservice. Microservices can be designed to control their internal operational states and behavior autonomously without regard to the statuses of other running services' instances or dependencies, and without any centralized management, coordination, or control. However, this lack of coordination among services leads to significant inefficiencies, particularly when the services experience a contingent event (e.g., a fault or other incident), excessively high demand (e.g., demand exceeding the available capacity of the resources), or other irregularity (e.g., operational unavailability). Some of the undesired effects of these inefficiencies can include excessive throttling, suboptimal overall throughput and operational limits, and/or unavoidable violations of overall service consumption limits, any of which can result in throttled calls to dependencies, and other resource depletions that degrade or otherwise adversely affect the performance of any or all of the services.

To this end, techniques are provided for coordination of microservice execution, in accordance with various examples of the present disclosure. This is achieved using a centralized, managed approach using components that dynamically control and regulate multiple microservice instances based on the available capacity of infrastructure and intermediate services upon which the microservices depend. For example, some microservice instances can have processor-intensive functionality enabled while others can distribute the load across processing and input/output (I/O) operations, depending on the needs of each microservice. In some examples, a microservice coordination subsystem includes one or more microservices, a client component, one or more analyzers, and one or more adapters to coordinate the execution of several microservice instances. One of the coordinating microservices, referred to as an operational control microservice (OCM) or simply a coordinator, receives operational data from various microservice instances and, in some cases, from the dependencies of those microservice instances. The coordinator can receive the operational data at periodic intervals, or it can actively query various infrastructure components on demand, using available infrastructure client libraries, for additional system information. The coordinator then invokes one or more subcomponents that analyze the collected operational data and provide optimized commands and/or parameters for regulating each individual microservice instance, which more efficiently manages the utilization of the infrastructure resources as compared to microservices operating autonomously. In this manner, the coordinator can, among other things, detect functional scenarios that may lead to faults or degraded operational modes of the microservice instances in aggregate, adjust the individual behavior of each microservice instance to recover from faults and to reduce or avoid service failures, and maintain each microservice and its dependencies within operational limits while deployed in a clustered environment.

For example, a given service (e.g., Service A, a class of service that can be instantiated and deployed in a cluster) processes messages coming from consumers (e.g., a customer facing web application) using a web browser. Service A depends on instances of another service (e.g., Service B, a service that can report health metrics to the coordinator) and a database service (e.g., a service that cannot report health metrics to the coordinator) that it is used by Service B. Service A is deployed in a cluster that contains n instances (copies) of the service to manage the load generated by many concurrent user requests. Service A has a throughput limit that can be modified to control its processing capacity. The coordinator is configured to ensure Service A instances always run as follows: i) within certain processing, memory, and disk capacity limits in each of the nodes (individual computers or virtual machines that form part of the cluster) where the service instances are deployed; ii) within current Service B throughput capacity (aggregated request per minute); and iii) within the database service aggregated (sum of all requests from any Service B instance) request per minute service level agreement.

The coordinator is further configured to perform one or more of the following actions: i) when a Service A instance node exceeds any resources limits (e.g., processing, memory, etc.), that instance is determined to be under stress and consequently the processing capacity can be decreased to restore the instance within the resource limits; ii) when a Service A instance is below its resources limits and other instances have high loads, the processing capacity can be increased to help balance the workload (given that database service limits are not being violated); iii) when Service B instances are overloaded and its overall throughput decreases, Service A overall processing capacity is decreased to match that of Service B; and iv) when the database service aggregated requests per minute is over the agreed limit, Service A can decrease the overall processing capacity proportionally to decrease calls to Service B, which will ultimately call the database service that is reporting an agreement violation.

In some examples, the coordinator is configured to perform one or more of the following operations. Periodically, all service instances (including database services) send metrics such as processing, memory, disk space, current throughput, requests per unit time, and other parameters to the coordinator. Periodically, the coordinator evaluates the limits of each service node, current service-to-service throughput limits, and database service requests per minute to determine if an action is required. For instance, when the action includes increasing or decreasing a service processing capacity (e.g., based on the above use cases), the coordinator sends target instances an adjusted throughput limit. The instance will set the adjusted throughput limit as the current operational value and the service capacity will be adjusted accordingly.

In some examples, microservice instances and their dependencies communicate with the coordinator using a client component that encapsulates communication logic. The client component further provides a cache to store commands and parameters that the coordinator pushes out to the microservices. Service instances are configured to switch to autonomous control if and when the coordinator becomes unavailable so that the coordinator does not become a single point of failure for the system.

Example System

FIG. 1 is a block diagram of a coordinated microservice system 100, in accordance with an example of the present disclosure. The system 100 includes a coordinator 102, a consumer service A 104, a consumer service B 106, and a provider service 108. The consumer service A 104 and the consumer service B 106 can include, for example, microservices, which are modular component parts of an application that are designed to run independently of other components. For example, microservices can include fine-grained and lightweight services that are relatively small, autonomously developed, independently scalable, and deployed independently of the larger application as modules or components that support or complement the application. In some examples, microservices can have one or more of the following characteristics: microservices run their own processes and communicate with other components and databases via their respective application programming interfaces (APIs); microservices use lightweight APIs to communicate with each other over a network; each microservice can be modified independently without having to rework the entire application; microservices follow a software development lifecycle designed to ensure that it can perform its particular function within the application; each individual microservice performs a specific function, such as adding merchandise to a shopping cart, updating account information, or transacting a payment; and the functionality of a microservice can be exposed and orchestrated by the API of the application, enabling development teams to reuse portions of an existing application to build new applications without starting from scratch.

Each instance of the consumer service A 104, the consumer service B 106, and the provider service 108 is designed to run independently of other such instances. For instance, the services 104, 106, 108 can access software, perform functions, and enable modularity across a distributed, service-oriented system. For example, each of the services 104, 106 108 can include a full runtime environment with libraries, configuration files, and dependencies for performing the respective functions of each service. The consumer service A 104 and the consumer service B 106 each include APIs to communicate with each other and with other services, such as the provider service 108. In some examples, the consumer service A 104 and the consumer service B each perform specific functions in conjunction with the provider service 108, such as adding merchandise to a virtual shopping cart, updating account information, or transacting a payment.

In some examples, the consumer service A 104 includes multiple (at least two) execution instances; that is, two or more instances of the consumer service A 104 can operate simultaneously. In operation, each instance of the consumer service A 104 uses, or otherwise depends upon, the consumer service B 106 to provide data to the respective instance of the consumer service A 104, and the consumer service B 106 uses, or otherwise depends upon, the provider service 108 to provide data to the consumer service B 106. The coordinator 102 monitors execution requests from each instance of the consumer service A 104 and monitors 110, 112, 114 performance metrics from the consumer service A 104, the consumer service B 106, and the provider service 108. The coordinator 102 calculates an available capacity of the consumer service B 106 to execute each of the execution requests based on (i) the monitored performance metrics of the consumer service A 104, the consumer service B 106, and the provider service 108 and (ii) a level of resource consumption associated with each of the execution requests (e.g., a measure of how much of the resources of the consumer service B 106 are needed to complete the respective execution requests). The coordinator 102 then modifies the throughput limit of the consumer service A 104. For example, if, given two execution requests (one from each of two instances of the consumer service A 104) the coordinator 102 determines that the consumer service B 106 is unable to process both of the execution requests simultaneously without causing a fault, delay, or other service interruption to both instances of the consumer service A 104, then the coordinator 102 will coordinate 116 the consumer service A 104 such that the consumer service A 104 decreases its throughput limit (to ease the load on the consumer service B 106).

In some examples, the system 100 can include a workstation, a laptop computer, a tablet, a mobile device, or any suitable computing or communication device. One or more components of the system 100, including the coordinator 102, the consumer service A 104, the consumer service B 106, and the provider service 108, can include or otherwise be executed using one or more processors 120, volatile memory 122 (e.g., random access memory (RAM)), non-volatile machine-readable mediums 124 (e.g., memory), one or more network or communication interfaces, a user interface (UI), a display screen, and a communications bus 126. The non-volatile (non-transitory) machine-readable mediums can include: one or more hard disk drives (HDDs) or other magnetic or optical machine-readable storage media; one or more machine-readable solid state drives (SSDs), such as a flash drive or other solid-state storage media; one or more hybrid machine-readable magnetic and solid-state drives; and/or one or more virtual machine-readable storage volumes, such as a cloud storage, or a combination of such physical storage volumes and virtual storage volumes or arrays thereof. The user interface can include one or more input/output (I/O) devices (e.g., a mouse, a keyboard, a microphone, one or more speakers, one or more biometric scanners, one or more environmental sensors, and one or more accelerometers, etc.). The display screen can provide a graphical user interface (GUI) and in some cases, may be a touchscreen or any other suitable display device. The non-volatile memory stores an operating system, one or more applications, and data such that, for example, computer instructions of the operating system and the applications, are executed by processor(s) out of the volatile memory. In some examples, the volatile memory can include one or more types of RAM and/or a cache memory that can offer a faster response time than a main memory. Data can be entered through the user interface. Various elements of the system 100 (e.g., including the coordinator 102, the consumer service A 104, the consumer service B 106, and the provider service 108) can communicate via the communications bus 126 or another data communication network.

The system 100 described herein is an example computing device and can be implemented by any computing or processing environment with any type of machine or set of machines that can have suitable hardware and/or software capable of operating as described herein. For example, the processor(s) of the system 100 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals. In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The processor can be analog, digital, or mixed. In some examples, the processor can be one or more physical processors, which may be remotely located or local. A processor including multiple processor cores and/or multiple processors can provide functionality for parallel, simultaneous execution of instructions or for parallel, simultaneous execution of one instruction on more than one piece of data.

The network interfaces can include one or more interfaces to enable the system 100 access a computer network such as a Local Area Network (LAN), a Wide Area Network (WAN), a Personal Area Network (PAN), or the Internet through a variety of wired and/or wireless connections, including cellular connections. In some examples, the network may allow for communication with other computing platforms, to enable distributed computing. In some examples, the network may allow for communication with including the coordinator 102, the consumer service A 104, the consumer service B 106, and the provider service 108, and/or other parts of the system 100 of FIG. 1.

Figure 2:
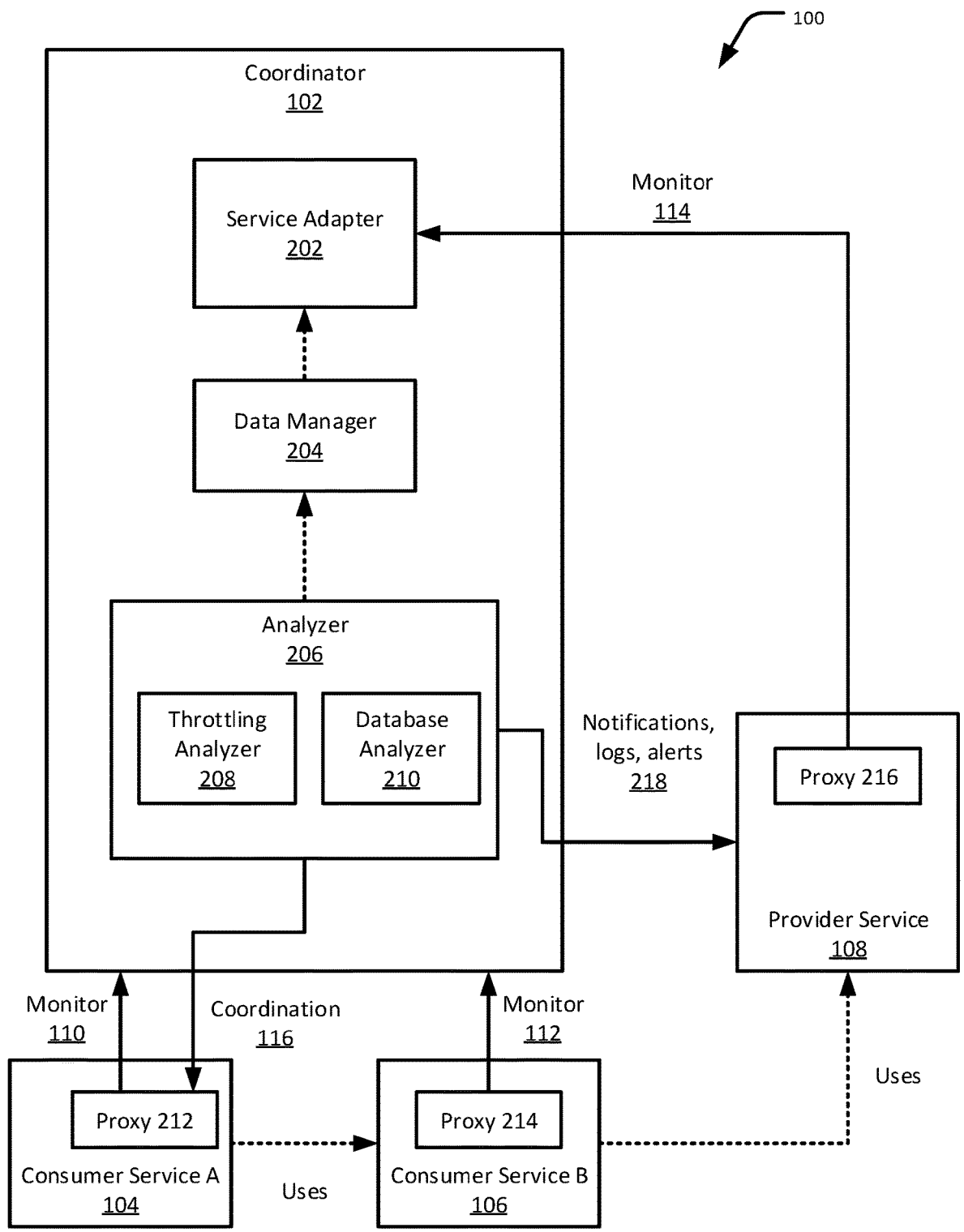
FIG. 2 is a more detailed block diagram of the coordinated microservice system of FIG. 1, in accordance with an example of the present disclosure.

FIG. 2 is a more detailed block diagram of the coordinated microservice system 100 of FIG. 1, in accordance with an example of the present disclosure. The coordinator 102 includes a service adapter 202, a data manager 204, and an analyzer 206. The analyzer 206 can include one or more function-specific modules, such as a throttling analyzer 208 and/or a database analyzer 210. The analyzer 206 can be tailored to meet specific requirements of the consumer services A 104, the consumer service B 106, and the provider service 108, such as resource quota and allocation requirements, bandwidth and throughput requirements, or level-ofservice requirements. The data manager 204 is configured to obtain, cache in a datastore, and make available the cached data, including performance metrics, that result from the monitoring 110, 112, 114 of the consumer services A 104, the consumer service B 106, and/or the provider service 108 via proxies 212 and 214 in the consumer services A 104 and the consumer service B 106, and via the service adapter 202 in the coordinator 102. The service adapter 202 and the proxies 212, 214 are configured to obtain and/or generate the data (e.g., metrics) from the respective services 104, 106, and to send coordination commands to the respective services 104, 106. The coordination commands allows the coordinator 102 to interact with the services 104, 106 via the proxies 212, 214 even if those services do not directly support such interactions.

The analyzer 206 consumes the data to detect and reacts to pre-defined performance scenarios and to coordinate execution requests from the services 104, 106. In some examples, the provider service 108 includes a proxy 216 to interact with the coordinator 102. The analyzer 206 can send notifications, logs, and alerts to the provider service 108. In operation, the coordinator 102 monitors and obtains performance metrics from the consumer service A 104, the consumer service B 106, and the provider service 108. The coordinator 102 provides the performance metrics to the data manager 204. The analyzer 206 detects one or more of the pre-defined performance scenarios (such as defined in a database) and coordinates operations with the consumer service A 104 to detect and mitigate faults, incidents, or other performance issues. For example, the throttling analyzer 208 can be configured to postpone (indefinitely) or delay (until a certain time or condition occurs) execution requests from a given instance of the consumer service A 104 to the consumer service B 106 at least until the consumer service B 106 has sufficient available capacity (e.g., quota, bandwidth, or other limited or constrained resources) to satisfy the anticipated resource consumption associated with executing the request without degrading or otherwise adversely impacting other services. In another example, the database analyzer 210 can be configured to postpone or delay execution requests from a given instance of the consumer service A 104 to the consumer service B 106 at least until the provider service 108 (e.g., a provider with a resident database that is used in conjunction with the consumer service A 104 and/or the consumer service B 106) has sufficient available capacity to satisfy the anticipated resource consumption associated with executing the request without degrading or otherwise adversely impacting other services. For example, consider the case where execution of an execution request by the consumer service A 104 depends on execution of an execution request by the consumer service B 106, which in turn depends on execution of an execution request by the provider service 108. In this case, if the provider service 108 has a usage per second capacity limit, each execution request will consume part of the capacity limit. However, the consumer service A 104, for instance, has no knowledge or awareness of the currently available capacity of the provider service 108 or the consumer service B 106. The coordinator 102 evaluates the available capacity of the provider service 108 and/or the consumer service B 106 and sends a coordination command to the consumer service A 104 to postpone or delay execution of the execution request at least until such time as the consumer service B 106 and/or the provider service 108 has sufficient capacity to execute the execution request without degrading or otherwise adversely impacting any other services.

Figure 3:
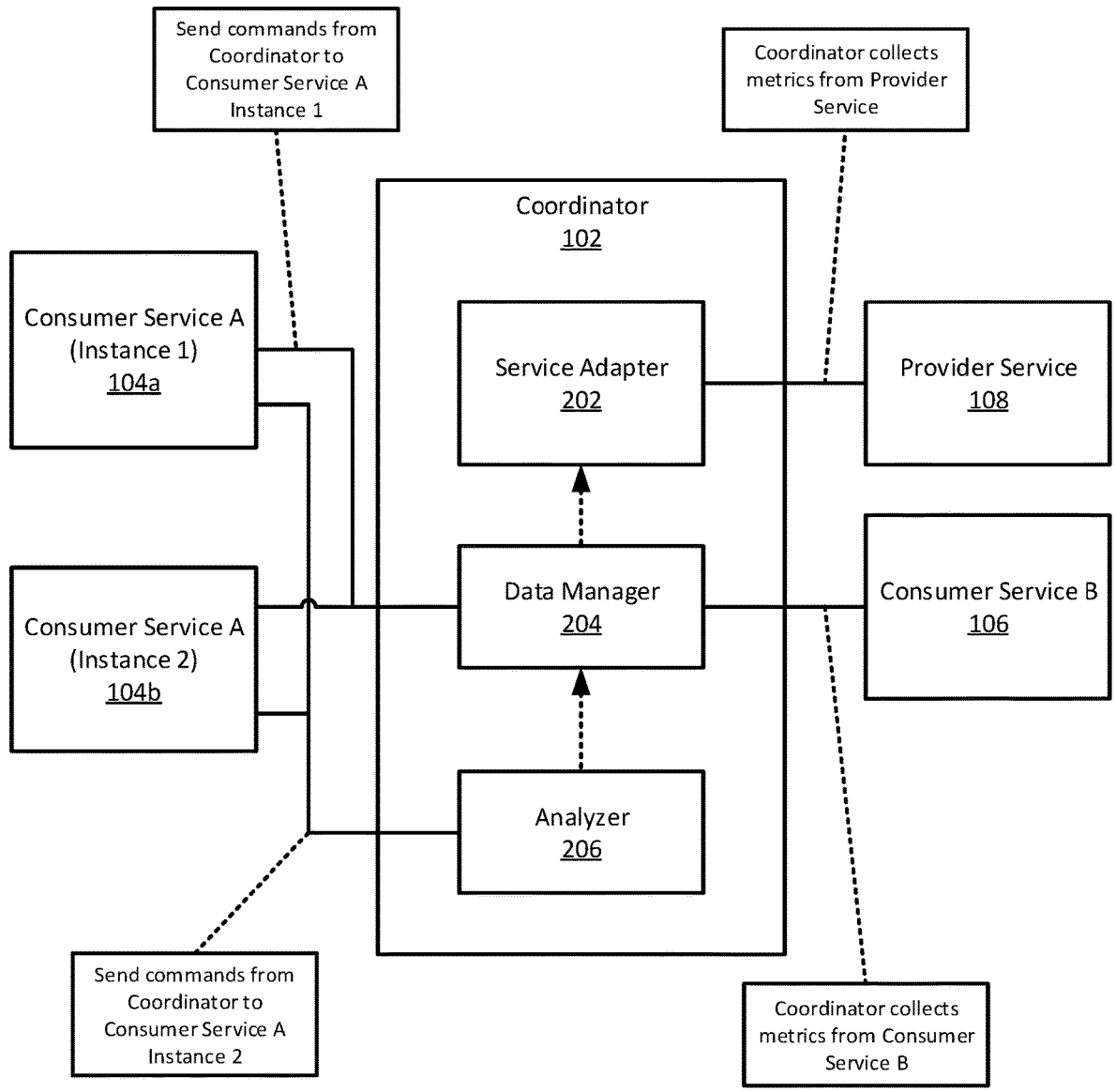
FIG. 3 is a block diagram of the coordinated microservice system of FIG. 1 during runtime, in accordance with an example of the present disclosure.

FIG. 3 is a block diagram of the coordinated microservice system 100 of FIG. 1 during runtime, in accordance with an example of the present disclosure. In this example, the consumer service A has at least two instances 104a and 104b. Correct and efficient execution of each instance of the consumer service A 104a, 104b depends on the correct and efficient execution of the consumer service B 106, which in turn depends on the availability of an infrastructure component, such as the provider service 108. For example, the provider service 108 can have a usage per second resource capacity limit, or some other suitable measure of the resource capacity. Each execution request from one of the instances of the consumer service A 104a, 104b to the consumer service B 106 will, upon execution, consume at least part of the available resource capacity of the consumer service B 106.

At any given time, individual instances of the consumer service A are unaware of the execution requests of other instances of the consumer service A. The coordinator 102 coordinates each execution request from one of the instances of the consumer service A 104a, 104b so that the active execution requests from all instances of the consumer service A 104a, 104b (i.e., execution requests that are currently in process) do not exceed the available resource capacity of the consumer service B 106. This can be achieved, for example, by throttling the execution requests from one or more of the instances of the consumer service A 104a, 104b, where any execution requests that would exceed the available resource capacity of the consumer service B 106 are delayed or otherwise postponed at least until the available resource capacity of the consumer service B exceeds the level of resource consumption associated with the respective execution request.

As noted above, the coordinator 102 collects performance metrics from the consumer service A 104, the consumer service B 106, and/or the provider service 108. The coordinator 102 calculates the available capacity of the consumer service B 106 to execute execution requests from any or all instances of the consumer service A 104a, 104b based on the collected performance metrics and the levels of resource consumption associated with each of the execution requests. In some examples, the coordinator 102 collects the performance metrics when the respective service 104, 106, 108 pushes the metrics via a local proxy (e.g., proxy 212, 214, 216). In some other examples, the coordinator 102 collects the performance metrics on-demand by requesting the metrics from the respective service 104, 106, 108 via the local proxy. Such on-demand request can be triggered by the coordinator 102, by the analyzer 206, or any other component of the coordinator 102, such as discussed with respect to FIG. 4.

Figure 4:
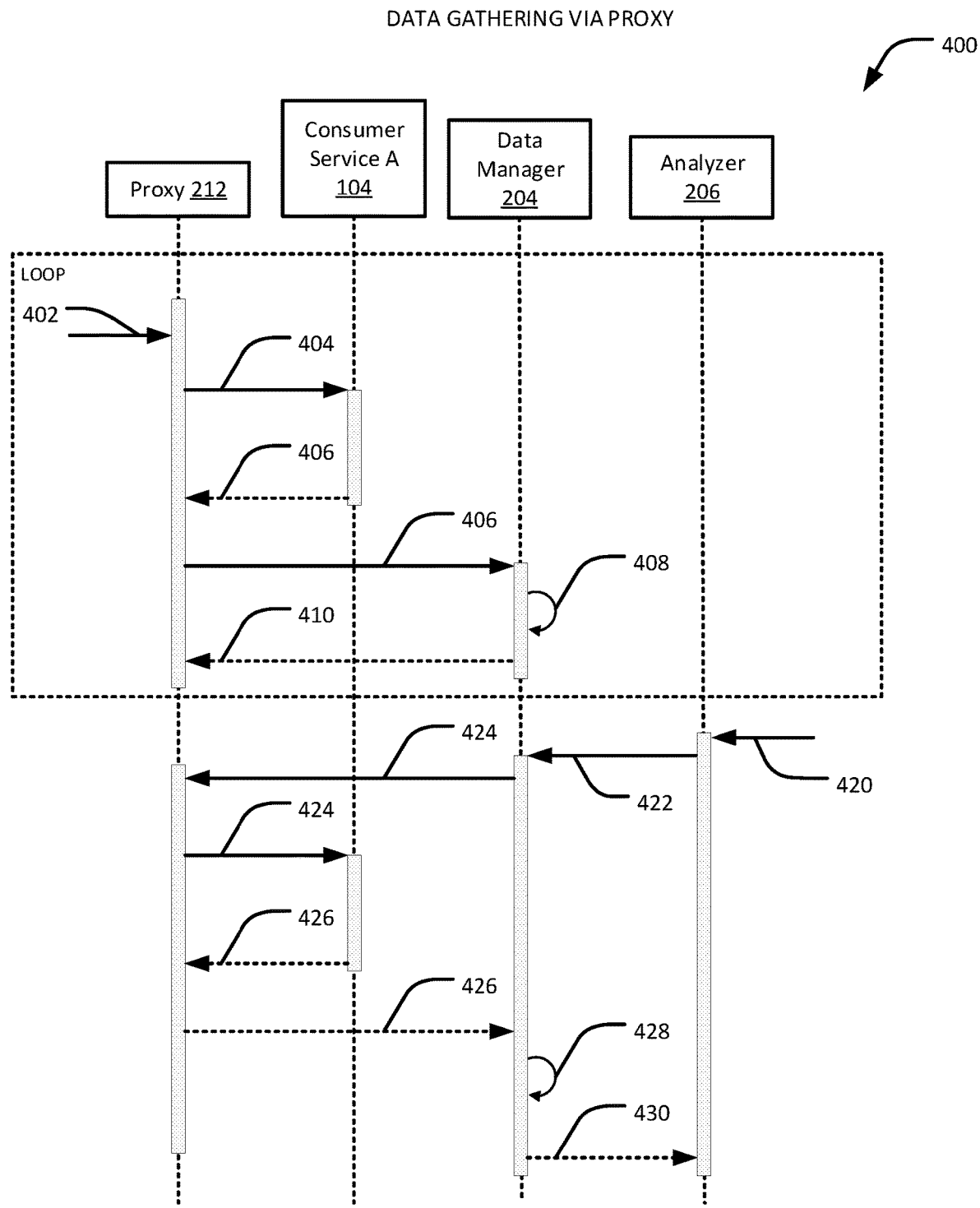
FIG. 4 is a data flow diagram of the coordinated microservice system of FIG. 1 during runtime, in accordance with an example of the present disclosure.

FIG. 4 is a data flow diagram 400 of the coordinated microservice system 100 of FIG. 1 during runtime, in accordance with an example of the present disclosure. In this example, during runtime, the coordinator 102 collects metrics from the consumer service A 104 via the proxy 212 at periodic intervals or on demand. When collecting the metrics periodically, a time-based event 402 (e.g., a periodic event) triggers the proxy 212 to send a get service metrics request 404 to an instance of the consumer service A 104. In response to the get service metrics request 404, the consumer service A 104 generates a service metrics request 406, which is pushed to the data manager 204 via the proxy 212. In response to the service metrics request 406, the data manager 204 retrieves 408 performance metrics from a data store and sends an acknowledgment 410 to the proxy 212.

The process of periodically collecting the metrics can be repeated in a loop indefinitely.

When collecting the metrics on demand, a signal event 420 (e.g., an on-demand event) triggers the analyzer 206 to send a service metrics request 422 to the data manager 204. In response to the service metrics request 422, the data manager 204 generates a get service metrics request 424, which is sent to an instance of the consumer service A 104 via the proxy 212. In response to the get service metrics request 424, the consumer service A 104 generates a service metrics request 426, which is pushed to the data manager 204 via the proxy 212. In response to the service metrics request 406, the data manager 204 retrieves 428 performance metrics from a data store and sends an acknowledgment 430 to the analyzer 206.

Figure 5:
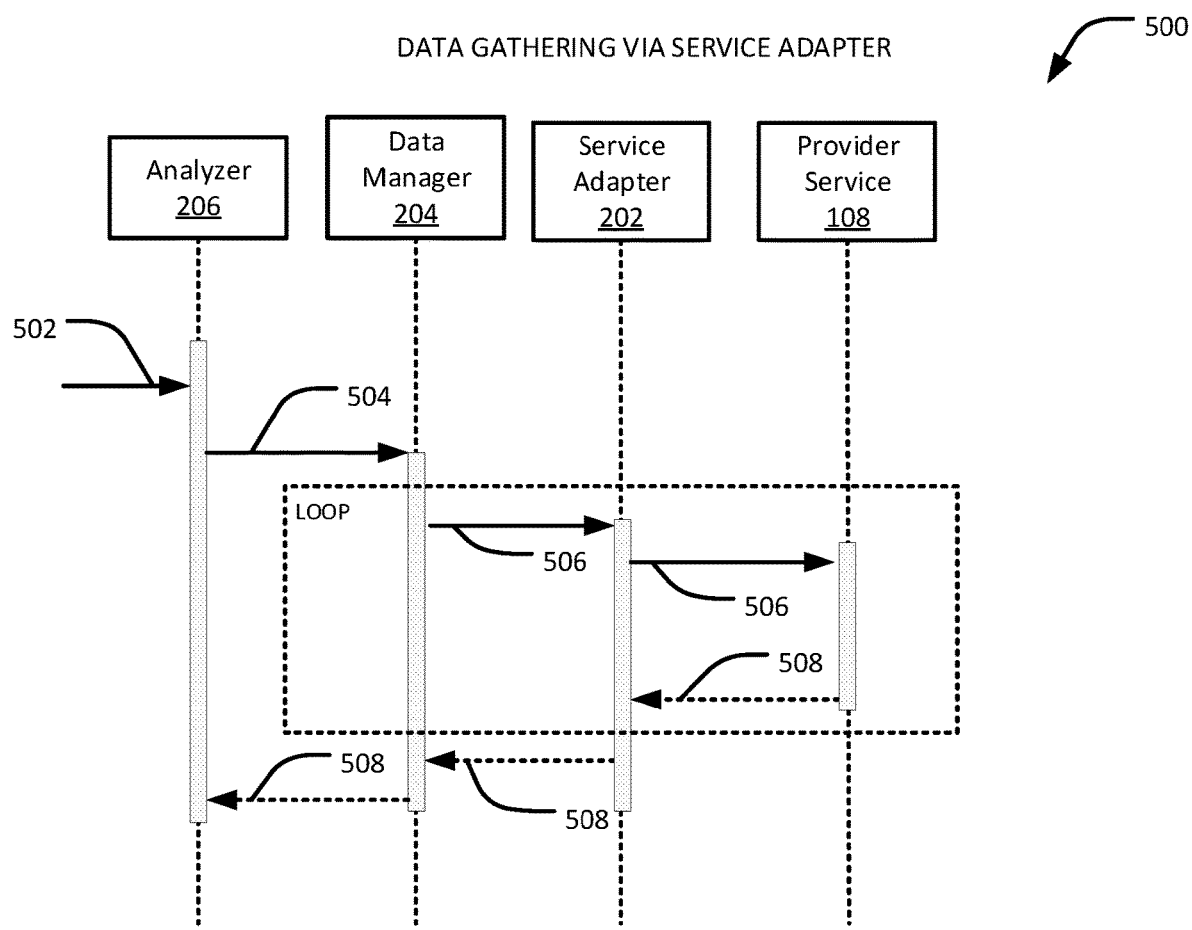
FIG. 5 is a data flow diagram of the coordinated microservice system of FIG. 1 during runtime, in accordance with another example of the present disclosure.

FIG. 5 is a data flow diagram 500 of the coordinated microservice system 100 of FIG. 1 during runtime, in accordance with another example of the present disclosure. In this example, during runtime, the coordinator 102 collects metrics from the provider service 108 via the service adapter 206. When collecting the metrics from the provider service 108, a signal 502 (e.g., a signal generated by a process) triggers the analyzer 206 to send a get service metrics request 504 to the service adapter 202. In response to the get service metrics request 504, service adapter 202 generates a service metrics request 506, which is sent to the provider service 108. In response to the service metrics request 506, the provider service 108 returns metrics 508 to the service adapter 202, which in turn sends the metrics 508 to the data manager 204, which in turn sends the metrics 508 to the analyzer 206. The process of collecting the metrics can be repeated in a loop indefinitely.

Figure 6:
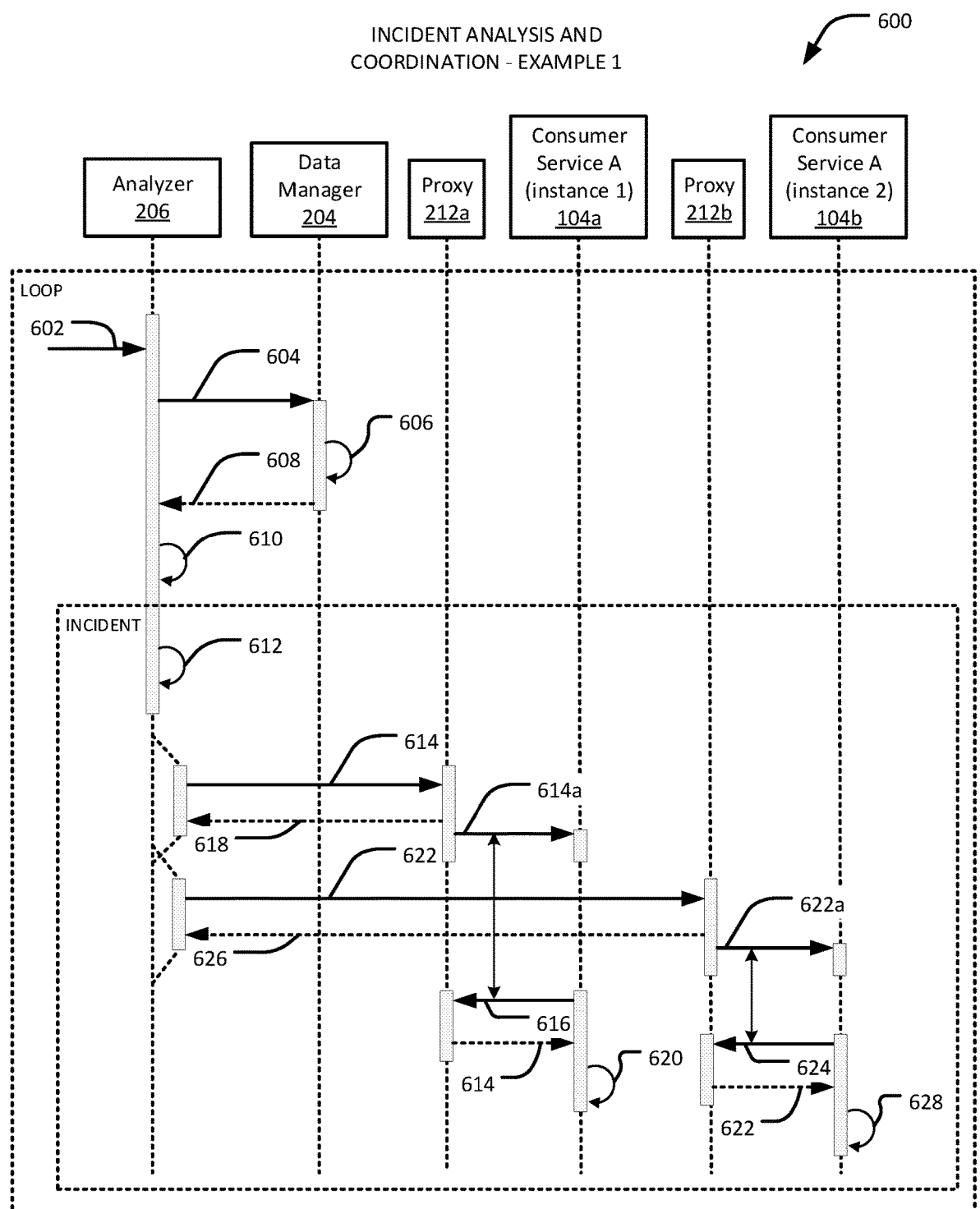
FIG. 6 is a data flow diagram of incident analysis and service coordination of the coordinated microservice system of FIG. 1, in accordance with an example of the present disclosure.

FIG. 6 is a data flow diagram 600 of incident analysis and service coordination of the coordinated microservice system 100 of FIG. 1, in accordance with an example of the present disclosure. The analyzer 206 consumes the metrics collected via the data manager 204, such as discussed with respect to FIGS. 4 and 5. The analyzer 206 can retrieve the metrics independently of the instances of the consumer service A 104. The analyzer 206 is configured to detect an event or incident and respond by applying one or more pre-defined rules or scenarios to the metrics. If an action is required, the analyzer 206 directs the coordinator 102 to send commands to the appropriate instance(s) of the consumer service A 104 via the proxy(s) 212.

For example, as shown in FIG. 6, different commands can be sent to different instances of the consumer service A 104a, 104b based on the metrics collected via the data manager 204. A time-based event 602 (e.g., a periodic event) triggers the analyzer 206 to send a get service metrics request 604 to the data manager 204. In response to the get service metrics request 604, the data manager queries 606 a database of collected metrics and returns metrics 608 satisfying the query to the analyzer 206. The query can include parameters such as a time period for computing the metrics, metrics for one or more services, or metrics for one or more service adapters.

The analyzer 206 applies the pre-defined rule(s) to the metrics 608 to determine if an incident 610 (or multiple incidents) or another event has occurred. For each incident 610, the analyzer 206 sends one or more coordination commands 612 to one or more instances of the consumer service A 104a, 104b via the proxies 212a, 212b. The coordination commands 612 can include a command for the respective instance of the consumer service A 104a, 104b to perform an execution request at a given time, thereby enabling the coordinator 102 to coordinate the execution requests of each instance of the consumer service A 104a, 104b.

For example, the analyzer 206 can send a first coordination command 614 and a first coordination command notification 614a to a first instance of the consumer service A 104a via the proxy 212a. The first coordination command notification 614a causes the first instance of the consumer service A 104a to fetch 616 the first coordination command 614 from the proxy 212a. In response to receiving the first coordination command 614, the proxy 212a sends an acknowledgement 618 to the analyzer 206. In response to receiving the first coordination command notification 614a, the first instance of the consumer service A 104a updates performance metrics 620 associated with that instance.

Similarly, the analyzer 206 can send a second coordination command 622 to a second instance of the consumer service A 104b via the proxy 212b, which sends a second coordination command notification 622a to the consumer service A 104b. The second coordination command notification 622a causes the second instance of the consumer service A 104b to fetch 624 the second coordination command 622 from the proxy 212b. In response to receiving the second coordination command 622, the proxy 212b sends an acknowledgement 626 to the analyzer 206. In response to receiving the second coordination command notification 622a, the second instance of the consumer service A 104b updates performance metrics 628 associated with that instance. In this manner, the coordinator 102 (via the analyzer 206) can monitor performance metrics from each instance of the consumer service A 104a, 104b and send separate coordination commands to each instance of the consumer service A 104a, 104b based on the pre-defined rules for mitigating incidents and other events, such as when execution or performance of one instance of the consumer service A 104a, 104b degrades execution or performance of another instance of the consumer service A 104a, 104b.

Figure 7:
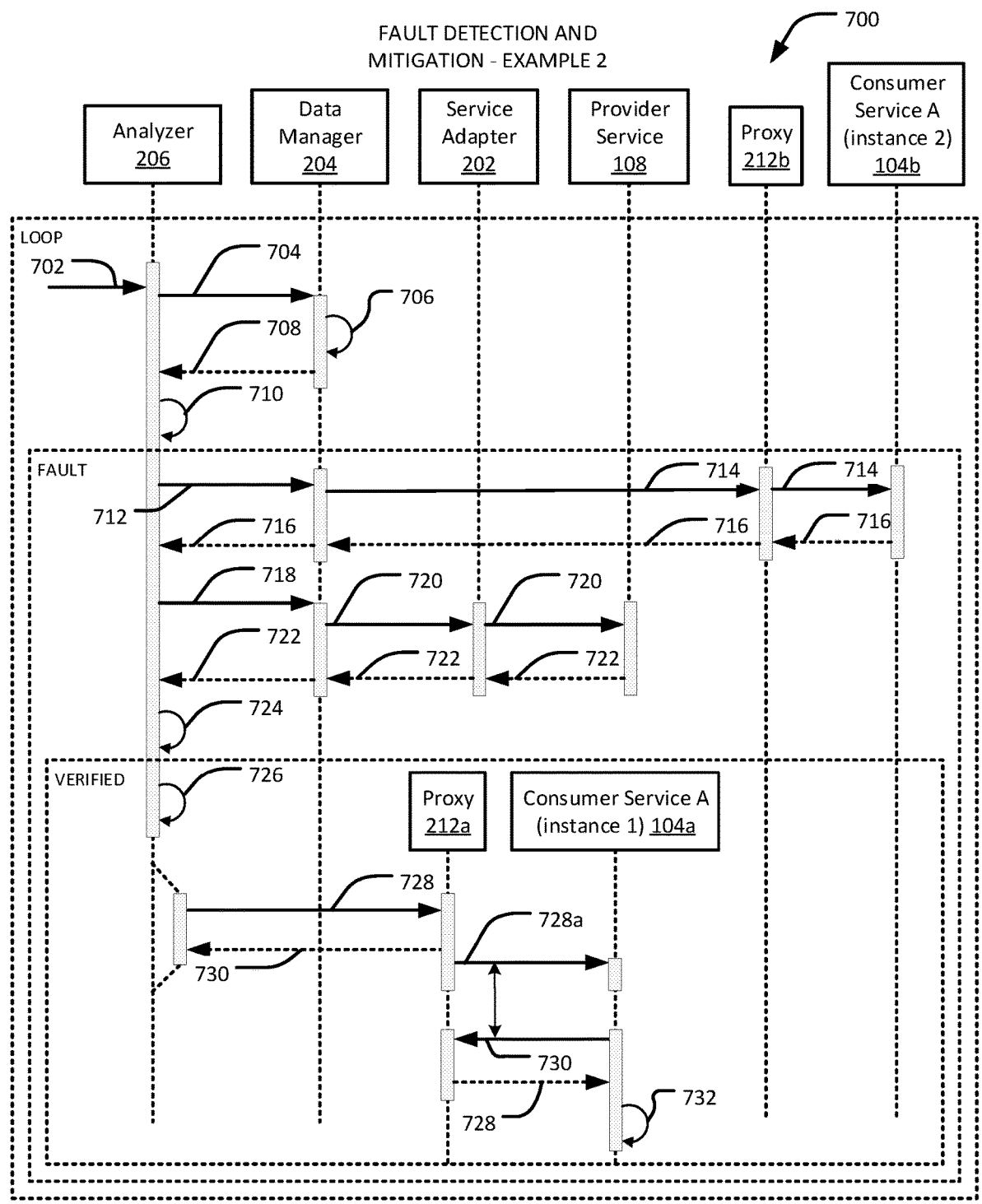
FIG. 7 is a data flow diagram of fault detection and mitigation of the coordinated microservice system of FIG. 1, in accordance with an example of the present disclosure.

FIG. 7 is a data flow diagram 700 of fault detection and mitigation of the coordinated microservice system 100 of FIG. 1, in accordance with an example of the present disclosure. The analyzer 206 consumes the metrics collected via the data manager 204, such as discussed with respect to FIGS. 4 and 5. The analyzer 206 can retrieve the metrics independently of the instances of the consumer service A 104. The analyzer 206 is configured to detect a fault and respond based on one or more pre-defined rules or scenarios. If an action is required, the analyzer 206 directs the coordinator 102 to send commands to the appropriate instance(s) of the consumer service A 104 via the proxy(s) 212.

For example, as shown in FIG. 7, different commands can be sent to different instances of the consumer service A 104a, 104b based on the metrics collected via the data manager 204. A time-based event 702 (e.g., a periodic event) triggers the analyzer 206 to send a get service metrics request 704 to the data manager 204. In response to the get service metrics request 704, the data manager queries 706 a database of collected metrics and returns metrics 708 satisfying the query to the analyzer 206. The query can include parameters such as a time period, one or more services, or one or more service adapters.

The analyzer 206 applies the pre-defined rule(s) to the metrics 708 to determine if a fault or incident 710 (or multiple faults or incidents) or another event has occurred. For each fault or incident 710, the analyzer 206 sends a get updated consumer service metrics request 712 to the data manager 204. In response to the get updated consumer service metrics request 712, the data manager 204 sends a get consumer metrics request 714 to the proxy 212b of a second instance of the consumer service A 104b, which in turn forwards the get consumer metrics request 714 to the second instance of the consumer service A 104b. In response to the get consumer metrics request 714, the second instance of the consumer service A 104b returns metrics 716 to the data manager 204 via the proxy 212b. In turn, the data manager 204 sends the consumer metrics 716 to the analyzer 206.

Additionally, for each fault or incident 710, the analyzer 206 sends a get updated provider service metrics request 718 to the data manager 204. In response to the get updated provider service metrics request 718, the data manager 204 sends a get provider metrics request 720 to the service adapter 202, which in turn forwards the get provider metrics request 720 to the provider service 108. In response to the get provider metrics request 720, the provider service 108 returns provider metrics 722 to the data manager 204 via the service adapter 202. In turn, the data manager 204 sends the provider metrics 716 to the analyzer 206.

The analyzer 206 applies the pre-defined rule(s) to the updated consumer and provider metrics 716, 722 to determine if the fault or incident (or multiple faults or incidents) or another event is verified 724. For each verified incident 724, the analyzer 206 sends one or more coordination commands 726 to a first instance of the consumer service A 104a via the proxy 212a. The coordination commands 726 can include a command for the first instance of the consumer service A 104a to perform an execution request at a given time, thereby enabling the coordinator 102 to coordinate the execution requests of the first instance of the consumer service A 104a.

For example, the analyzer 206 can send a first coordination command 728 to the first instance of the consumer service A 104a via the proxy 212a, which sends a first coordination command notification 728a to the consumer service A 104a. The first coordination command notification 728a causes the first instance of the consumer service A 104a to fetch 730 the first coordination command 728 from the proxy 212a. In response to receiving the first coordination command 728, the proxy 212a sends an acknowledgement 730 to the analyzer 206. In response to receiving the first coordination command 728, the first instance of the consumer service A 104a updates performance metrics 732 associated with that instance. In this manner, the coordinator 102 (via the analyzer 206) can monitor performance metrics from the second instance of the consumer service A 104b and from the provider service 108, and send a coordination command to the first instance of the consumer service A 104a based on the pre-defined rules for mitigating faults, incidents, and other events, such as when execution or performance of the second instance of the consumer service A 104b and/or the execution or performance of the provider service 108 degrades execution or performance of the first instance of the consumer service A 104a (according to the updated performance metrics 732).

Figure 8:
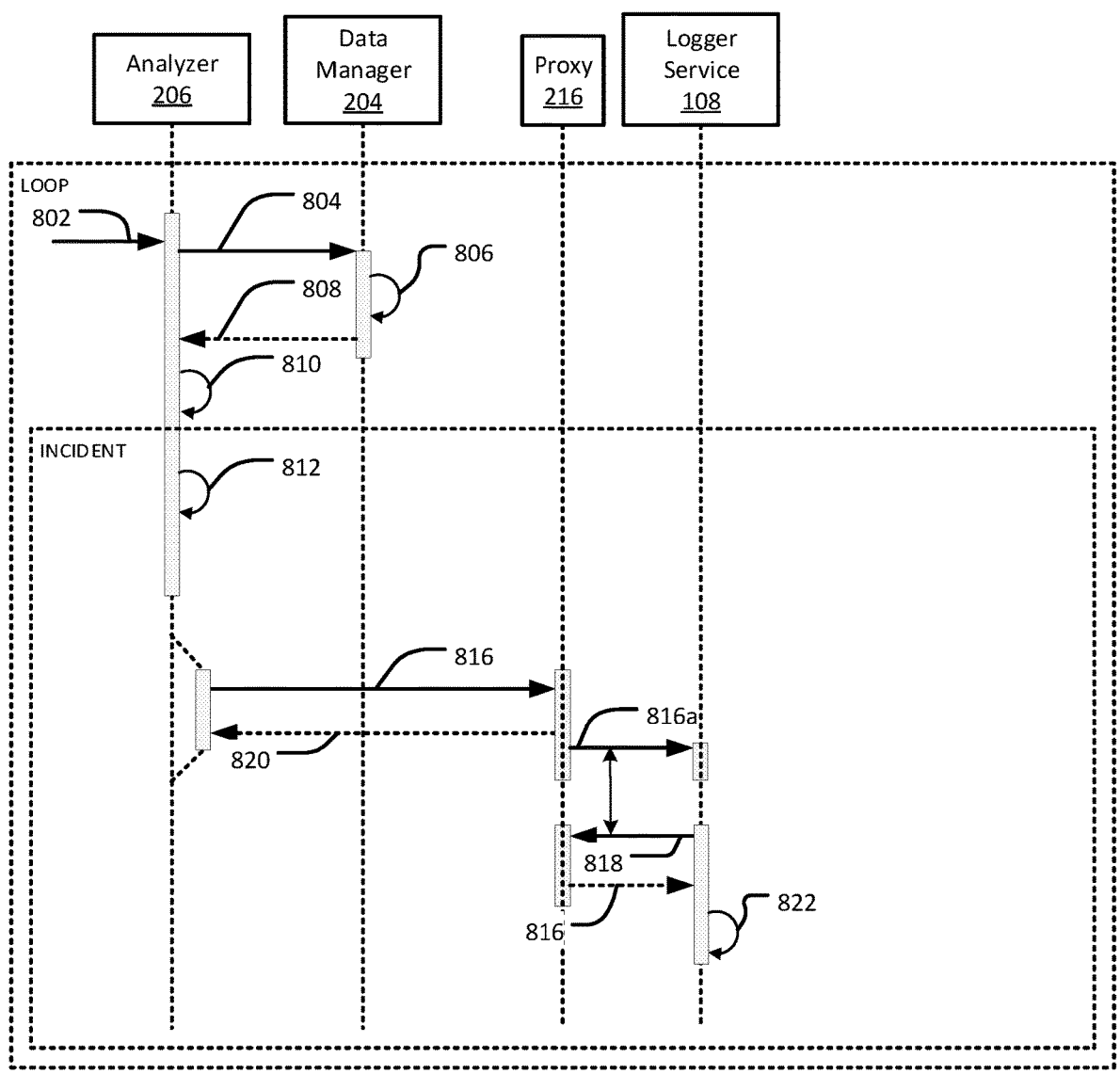
FIG. 8 is a data flow diagram of service behavior logging of the coordinated microservice system of FIG. 1, in accordance with an example of the present disclosure.

FIG. 8 is a data flow diagram 800 of service behavior logging of the coordinated microservice system 100 of FIG. 1, in accordance with an example of the present disclosure. In some cases, the analyzer 206 generates logs and/or alerts based on a pre-defined set of rules or scenarios without changing the behavior of any services. The analyzer 206 consumes the metrics collected via the data manager 204, such as discussed with respect to FIGS. 4 and 5, and generates one or more logs and alerts based on the metrics.

For example, as shown in FIG. 8, a time-based event 802 (e.g., a periodic event) triggers the analyzer 206 to send a get service metrics request 804 to the data manager 204. In response to the get service metrics request 804, the data manager queries 806 a database of collected metrics and returns metrics 808 satisfying the query to the analyzer 206. The query can include parameters such as a time period, one or more services, or one or more service adapters.

The analyzer 206 processes the metrics 808 to determine if a fault or incident 810 (or multiple faults or incidents) or other event has occurred based on the pre-defined rules or scenarios. For each fault or incident 810, the analyzer 206 sends one or more coordination commands 812 to a logger service 108 via the proxy 216. The coordination commands 812 can include a command for the logger service 108 to log one or more of the coordination commands 812.

For example, the analyzer 206 can send a coordination command 816 to the logger service 108 via the proxy 216, which sends a coordination command notification 816a to the logger service 108. The coordination command notification 816a causes the logger service 108 to fetch 818 the coordination command 816 from the proxy 216. In response to receiving the coordination command 816, the proxy 216 sends an acknowledgement 820 of receipt of the coordination command 816 to the analyzer 206. In response to receiving the coordination command notification 816a, the logger service 108 logs performance metrics 822 associated with the system 100.

Example Process

Figure 9:
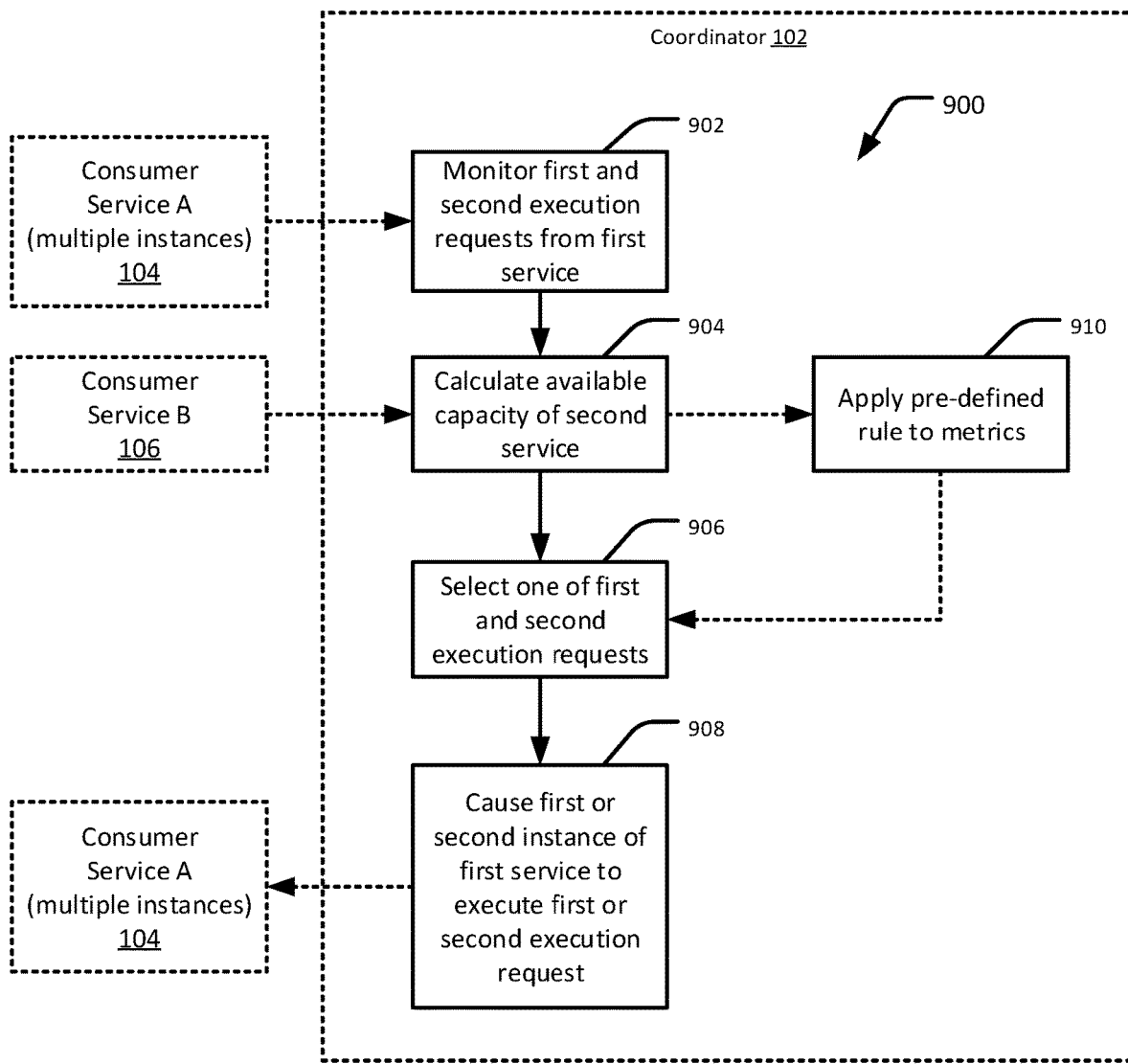
FIG. 9 is a flow diagram of an example service coordination process, in accordance with an example of the present disclosure.

FIG. 9 is a flow diagram of an example service coordination process 900, in accordance with an example of the present disclosure. The process 900 can be implemented, for example, by the coordinator 102 of the system 100 of FIG. 1. The process 900 includes monitoring 902 a first execution request from a first instance of a first service and a second execution request from a second instance of the first service. The first and second execution requests include requests issued by the first service to a second service, where the second service executes the request on behalf of the first service (such as when the first service depends on the second service to perform a task or to provide a result of the task). The first execution request is associated with a first level of resource consumption, and the second execution request is associated with a second level of resource consumption. For example, the first execution request may cause the second service to consume the first level of resource consumption during execution of the request (e.g., processing resources, data storage resources, networking resources, or any other resources used to execute the first execution request in part or to completion). Similarly, the second execution request may cause the second service to consume the second level of resource consumption during execution of the request, which may be different from the first level of resource consumption (e.g., the first execution request may consume more or fewer resources on the second service than the second execution request).

The method 900 further includes calculating 904 an available capacity of a second service to execute the first execution request and the second execution request based on a performance metric of the second service, the first level of resource consumption, and the second level of resource consumption. The performance metric of the second service can include any value that measures the current or recent available capacity of the second service, such as how much processing, storage, or network capacity is unused at a given time or during a given time period. In other words, the performance metric of the second service serves as a measure of how much capacity is available for the second service to service the first and/or second execution requests based on the first and second levels of resource consumption for each respective request. For example, if the first execution request requires 10 minutes of processing resources on the second service and the second execution request requires 5 minutes of processing resources on the second service, these levels of resource consumption can be compared to the performance metric of the second service to determine the available capacity of the second service to service the first execution request, the second execution request, or both within that available capacity.

The method 900 further includes selecting 904 one of the first execution request and the second execution request based on the available capacity of the second service. For example, if the performance metric of the second service indicates that the second service is consuming 40% of its total capacity over a 10-minute period (i.e., 4 minutes of capacity over the 10 minute period), then the second service would have sufficient available capacity to service the second execution request (5 minutes) without degrading the performance of the second service or any service that depends on the second service, including one or more instances of the first service. Likewise, the second service would not have sufficient available capacity to service the first execution request (10 minutes) without degrading the performance of the second service or any service that depends on the second service, including one or more instances of the first service. In this example, the second execution request would be selected because the second service has sufficient available capacity to service the second execution request, but insufficient available capacity to service the first execution request. Other examples will be apparent in view of these factors.

The method 900 further includes causing 908 the first instance of the first service to execute the first execution request in response to selecting the first execution request, and causing 908 the second instance of the first service to execute the second execution request in response to selecting the second execution request. This can be accomplished in several ways. For example, the coordinator 102 can cause the first execution request, if selected, to be executed by sending a coordination command to the first or second services granting permission for the first execution request to be executed. In another example, the coordinator 102 can cause the first execution request, if selected, to be executed by sending a coordination command to the first or second services postponing or otherwise delaying execution of the second execution request at least until the first execution request has completed. Similarly, the coordinator 102 can cause the second execution request, if selected, to be executed by sending a coordination command to the first or second services granting permission for the second execution request to be executed. In another example, the coordinator 102 can cause the second execution request, if selected, to be executed by sending a coordination command to the first or second services postponing or otherwise delaying execution of the first execution request at least until the second execution request has completed. Other examples will be apparent.

In some examples, calculating the available capacity of the second service is further based on a performance metric of a third service from which the second service depends to execute the first execution request and/or the second execution request. For example, if an instance of the consumer service A 104 depends on an instance of the consumer service B 106, which in turn depends on the provider service 108, then the available capacity of the consumer service B to perform the execution request 106 is based on both the performance metric of the consumer service B 106 and the performance metric of the provider service 108 (e.g., if the provider service 108 does not have sufficient available capacity to service the consumer service B 106, then the consumer service B 106 is constrained by the provider service 108 in the ability of the consumer service B 106 to service the execution request from the consumer service A 104).

In some examples, causing 908 the first instance of the first service to execute the first execution request includes sending a first coordination command to the second instance of the first service, and causing 908 the second instance of the first service to execute the second execution request includes sending a second coordination command to the first instance of the first service. In such cases, the first coordination command and the second coordination command each include a command to postpone or delay the second execution request and the first execution request, respectively. The coordination commands can be used to delay or postpone the first or second execution requests at least until the second service has sufficient available capacity to service those execution requests.

In some examples, the method 900 includes receiving, via a proxy associated with the second service, the performance metric associated with the second service, and storing the performance metric associated with the second service in a datastore prior to calculating the available capacity of the second service to execute the first execution request and the second execution request. By storing the performance metric in the datastore prior to calculating the available capacity of the second service to execute the first and second execution requests, the process has faster or immediate access to the performance metric without incurring delays due to the time needed to fetch the performance metric from the second service, improving overall performance of the process.

In some examples, the performance metric is received at a periodic interval (e.g., the performance metric is pushed out) or in response to a request to get the performance metric from the second service (e.g., the performance metric is requested on demand).

In some examples, the method 900 includes applying 910 a pre-defined rule to the performance metric of the second service to determine whether an event (e.g., a fault, incident, or other pre-defined condition) has occurred, where one of the first execution request and the second execution request is selected based on a determination that the event has occurred. In some further examples, the performance metric of the second service is a first performance metric, the pre-defined rule is a first rule, and the method further comprises applying a second pre-defined rule to a second performance metric of the second service to determine whether the event is verified. In this example, one of the first execution request and the second execution request is selected based on a determination that the event, once detected, is also verified.

Dynamically Coordinated Service Maintenance Operations

Services, including microservices, can be deployed in various configurations depending on, for example, the system architecture and the supporting infrastructure. In some cases, redundant services are deployed to provide high or nearly continuous availability of the services. Nevertheless, service outages and interruptions are possible when the services undergo maintenance, such as restarts, backups, and other routine activities. An operational plan can be used to prevent or reduce outages. For example, maintenance actions can be scheduled to occur during planned service outages, which helps avoid unexpected or otherwise undesirable interruptions. Although it is possible to create a static plan for accommodating maintenance activities, the maintenance activities may nevertheless fail to complete properly or during the planned outage timeframe. For example, scripted maintenance activities may not have current information about changes to the internal state or deployment topography of the various services that are impacted by the maintenance activities. Thus, dynamic conditions occurring prior to or during maintenance operations, such as changing services internal operation states, the addition or removal of services, and topographical permutations, are difficult to manage and can lead to service outages when a static managed approach is used for scheduling maintenance.

To this end, in accordance with an example of the present disclosure, techniques are disclosed for dynamically coordinating service maintenance operations among multiple services via the coordinator 102 of FIG. 1. In this example, the coordinator 102 is configured to identify a topography of the services (e.g., the location of each service within a network or infrastructure, such as time zone, country, business unit, etc.) and to generate and carry out a maintenance operations execution plan according to rules defining a set of actions that can be performed for a given topography of the services.

Figure 10:
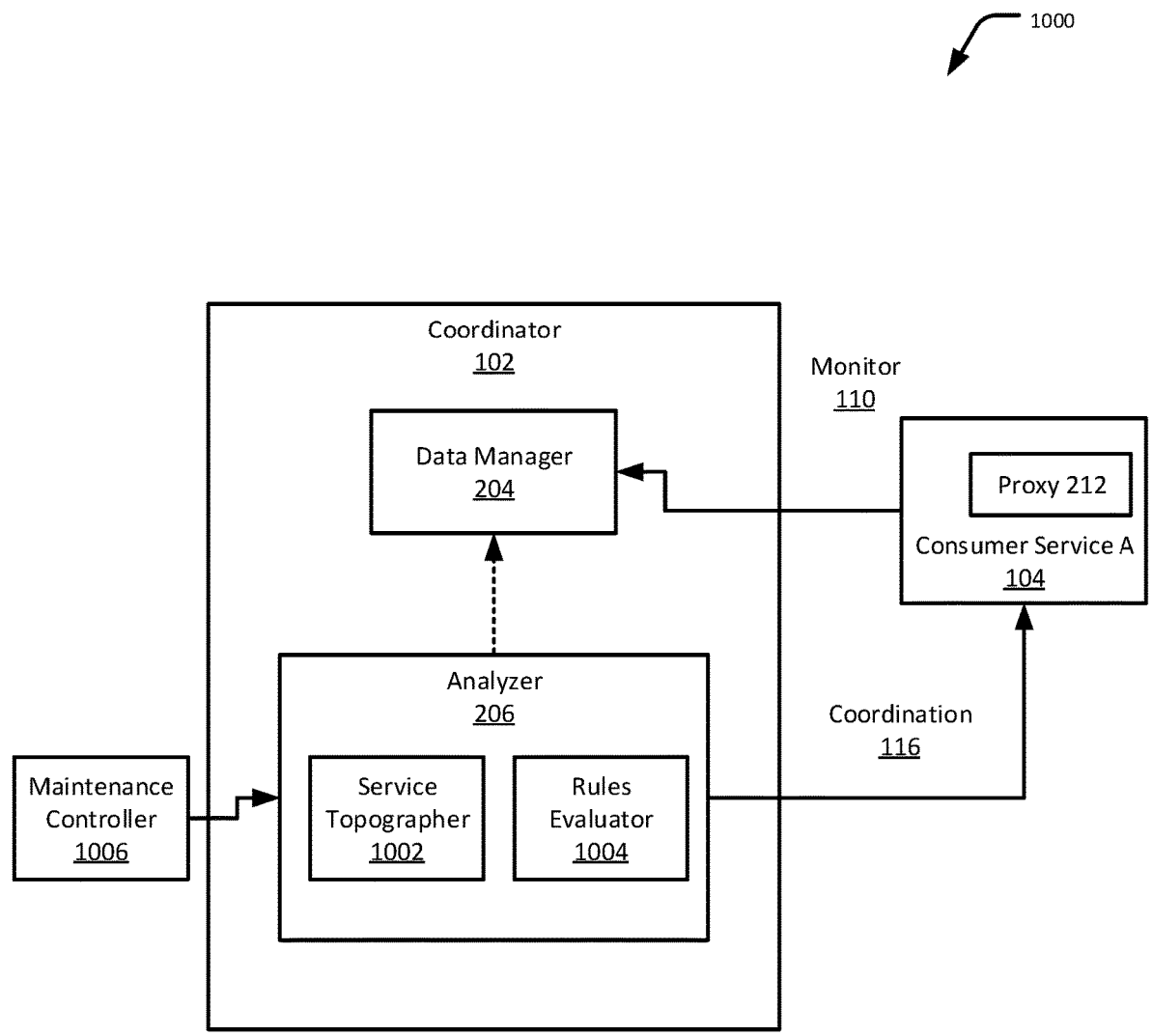
FIG. 10 is a block diagram of a coordinated microservice system, in accordance with an example of the present disclosure.

FIG. 10 is a block diagram of a coordinated microservice system 1000, in accordance with an example of the present disclosure. In this example, the analyzer 206 is configured to include a service topographer 1002 and a rules evaluator 1004. The analyzer 206 generates a topography representing one or more services deployed in an environment and creates an execution plan for any actions (e.g., maintenance operations or other actions that can potentially disrupt or degrade service levels) that can potentially cause service outages. At least some of the actions can, for instance, be considered a high-risk maintenance action (HRMA) that can cause one or more services to become at least temporarily unavailable, for example, during reboot, update, reconfiguration, or backup operations. The execution plan is created dynamically from a service topography object created, via the data manager 204, from current data acquired from one or more of the services potentially impacted by the actions (e.g., the consumer service A 104 or any other services) and a set of predefined rules. The rules are defined as settings that can be loaded into the coordinator 102. For example, the rules can define whether a given instance of a service is available or not available for executing the actions in the execution plan based on the status of the service instance or other performance metrics relating to the service instance, how many steps are needed to perform a given action on the service instance, or which service instances can execute a given action in parallel. The rules evaluator 1004 uses the rules to evaluate the current data in the data manager 204. For example, the rules can define a scenario or set of conditions or statuses of the topography under which a certain execution plan is established for conducting the maintenance operations. The execution plan can attempt to execute commands for performing the maintenance operations concurrently in as many service instances as possible without creating any unplanned outages or overall degradation of services.

Figure 11:
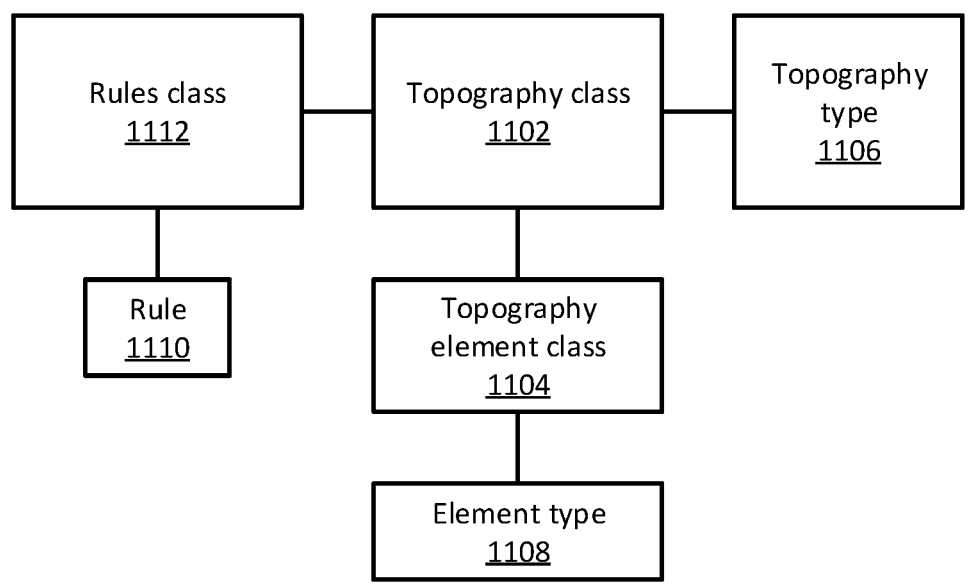
FIG. 11 is a block diagram of a topographical data hierarchy that can used by the service topographer to generate a topography of one or more services, in accordance with an example of the present disclosure.

FIG. 11 is a block diagram of a topographical data hierarchy that can used by the service topographer 1002 to generate a topography of one or more services, in accordance with an example of the present disclosure. The service topographer 1002 uses one or more patterns, including hierarchical or linear organization patterns, to generate one or more topography objects representing the topography of services within a given service deployment organization. A topography object is defined as a member of a topography class 1102, which defines a class of topography elements 1004 corresponding to one or more topography types 1106. Within each topography element class 1104 is an object having an element type 1108. The object is represented by a root node that can be used to create linear collections, trees, and graphs representing the topography of the services and related infrastructure. Data used to maintain the topography objects is received from each service instance (e.g., an instance of the consumer service A 104 or any other service) via the data manager 204. Each instance reports the position of the respective service within the deployment topography. The rules evaluator 1004 parses and interprets predefined rules 1110 (members of a rules class 1112) that are used to create and validate execution steps in the execution plan for each service instance in the topography class 1102.

During maintenance operations, an external actor, a service, or another analyzer can request that the analyzer 206 execute an action (e.g., HRMA) on demand. The analyzer 206 determines the scope of the request based on context and uses the topography object, the status of the current service, and/or predetermined rules to determine one or more of the following:

1. A number of steps required to execute the action in all service instances. For example, a maintenance operation can include several steps, such as shutting down a database engine, performing a backup of the database, and restarting the database engine; shutting down a service, performing a software update, and restarting the service; or shutting down a service, performing a reboot of the device executing the service, and restarting the service.

2. Which instances of services are to execute steps in parallel (e.g., for optimization). For example, multiple instances of a service can be shut down in parallel before performing a database backup, software update, or device reboot, and subsequently each of the service instances can be restarted in parallel.

3. Step execution validation and delays. For example, at the completion of each step the maintenance controller 1006 can verify that the corresponding action was completed successfully and within a prescribed amount of time.

4. Step execution rollbacks. For example, if an execution step fails to complete properly, the maintenance controller 1006 can roll the state of the service back to a previously saved state before restarting the service.

5. Final state validation (e.g., rollouts/rollbacks). For example, the maintenance controller 1006 can determine whether any execution step or rollback has completed before starting the next step.

For each execution step defined in the execution plan, a command is sent to the target service instance (e.g., the consumer service A 104) requesting command execution. Each service executes the command internally and reports the final status to the coordinator 102. If a failure occurs on the service, the command can be retried, or another compensating action can be performed, such as a rollback or reboot. For example, if a maintenance step fails (e.g., as determined using a validation rule via the rules engine 1004), the coordinator 102 sends a rollback command to all services that successfully received and executed the command, following the same steps in reverse order. After all validation rules for each step have passed, the coordinator 102 performs a final state analysis to determine whether the maintenance operation has completed successfully.

Figure 12:
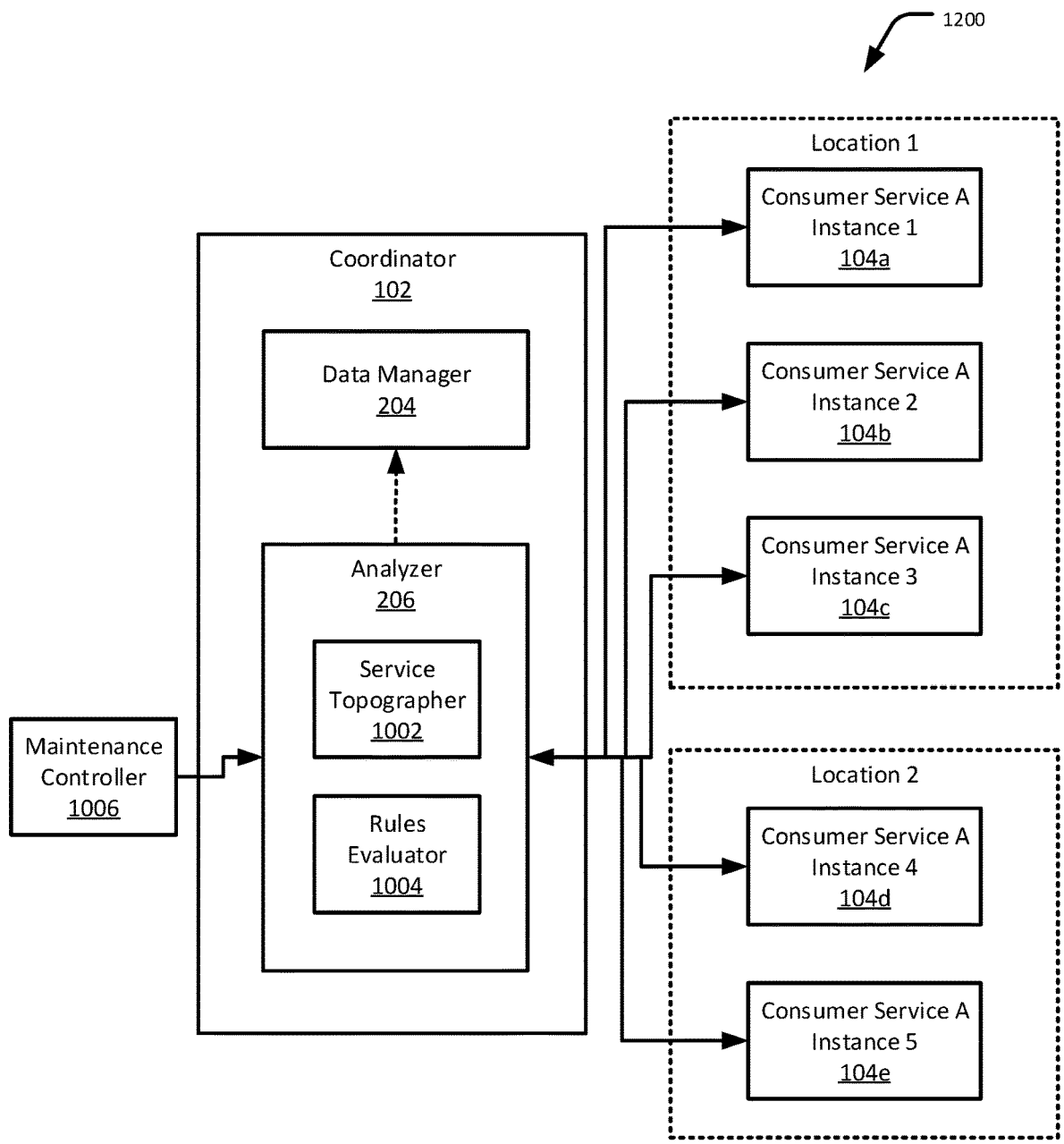
FIG. 12 is a block diagram of a coordinated microservice system, in accordance with an example of the present disclosure.

FIG. 12 is a block diagram of a coordinated microservice system 1200, in accordance with an example of the present disclosure. The system 1200 includes one or more services (e.g., consumer service A 104 and/or other services), and each of the services can have one or more instances (e.g., consumer service A instances 1-5 (104a-e)). Each service instance 104a-e reports periodically or immediately when changes occur to the current topographic information of the respective instance to the maintenance coordinator 1006 via the data manager 204 of the coordinator 102. In turn, the service topographer 1002 updates the topography of the service 104a-e according to the reported change(s). The topography is represented by one or more objects each describing how instances of the service(s) are deployed by specifying topographic data specific to the deployment pattern (an array, a tree, etc.). The object is updated periodically or on demand should changes occur.

When an external or internal component requests execution of a maintenance action via the maintenance controller 1006, the analyzer 206 is notified and generates an execution plan by evaluating the predetermined rules against the current topography as generated by the service topographer 1002. While executing existing execution plans, instances of the services (e.g., instances 104a-e) may change availability or topographic information, or the services may enter a state that changes the eligibility of the service for performing the maintenance operations within the respective execution plan. When this occurs, the analyzer 206 reacts to the change while executing the planned operation, reassesses the rules against the change, and creates a new execution plan that will continue to carry on the initial request without affecting availability. These operations can continue until a successful state is reached or a cancellation of the request is received (e.g., by the requester or via a validation rule).

Figure 13:
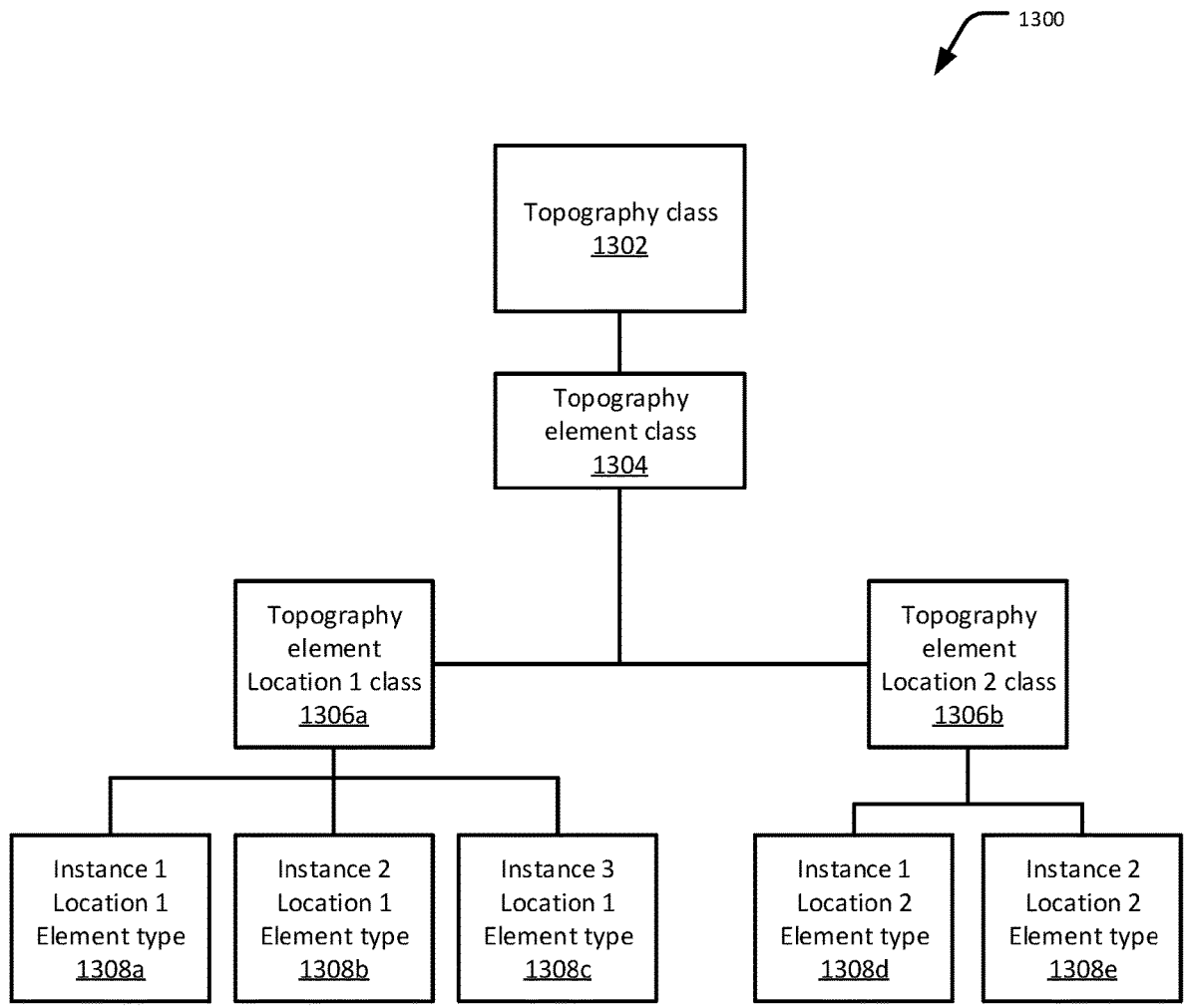
FIG. 13 is a block diagram of an example object hierarchy used by the service topographer of FIG. 12, in accordance with an example of the present disclosure.

FIG. 13 is a block diagram of an example object hierarchy 1300 used by the service topographer 1002. Within the hierarchy 1300 is a topography class 1302 for defining a given service deployment (e.g., an infrastructure or set of services). Within the topography class 1302 are one or more topography element classes 1304 that can represent different locations within the deployment. For example, the services 104a, 104b, and 104c can be in Location 1 and the services 104d and 104e can be in Location 2, such as shown in FIG. 12. For each location, there is a corresponding location class 1306a, 1306b. Within each location class 1306a, 1306b, there are elements 1308a, 1308b, 1308c, 1308d, and 1308e defined for each service instance 104a-e.

Figure 14:
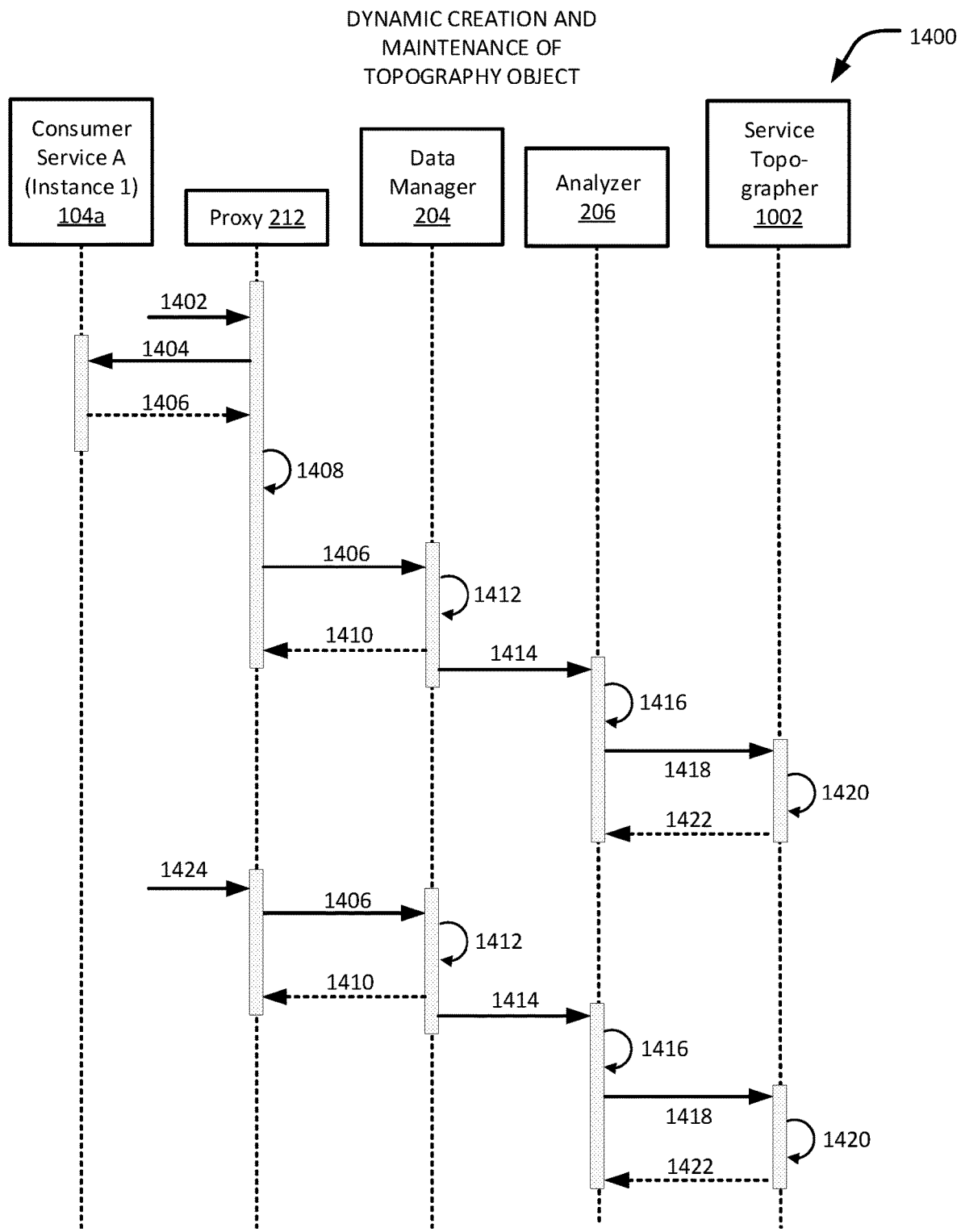
FIG. 14 is a data flow diagram of the coordinated microservice system of FIG. 1 during dynamic creation and maintenance of a topography object, in accordance with an example of the present disclosure.

FIG. 14 is a data flow diagram 1400 of the coordinated microservice system of FIG. 1 during dynamic creation and maintenance of a topography object, in accordance with an example of the present disclosure. In an example, a timed or periodic signal 1402 causes the proxy 212 of an instance of the consumer service A 104a to request 1404 a current status from the respective instance 104a, which in response provides the current status 1406. In response 1408 to receiving the current status 1406, the proxy 212 pushes the current status 1406 to the data manager 204, which then provides an acknowledgement 1410 to the proxy 212 and stores 1412 the current status 1406. The data manager 204 then notifies 1414 the analyzer 206 that the current status 1406 is available. In response, the analyzer 206 evaluates 1416 the current status 1406 against one or more rules to determine whether the current status 1406 changes the existing topography. For example, if the current status 1406 is shut down, unavailable, or offline, the topography is changed to remove the respective instance 104a. In another example, if the current status 1406 is running, available, or online, the topography is changed to add the respective instance 104a. Next, the analyzer 206 informs 1418 the service topographer 1002 of any changes to the topography, which in turn updates 1420 the topography based on the changes and sends an acknowledgement 1422 to the analyzer 206.

In another example, instead of the timed or periodic signal 1402, an external signal 1424 indicating that the topography has changed causes the proxy 212 of an instance of the consumer service A 104a to push the current status 1406 to the data manager 204, which then provides the acknowledgement 1410 to the proxy 212 and stores 1412 the current status 1406. The data manager 204 then notifies 1414 the analyzer 206 that the current status 1406 is available. In response, the analyzer 206 evaluates 1416 the current status 1406 against one or more rules to determine whether the current status 1406 changes the existing topography. Next, the analyzer 206 informs 1418 the service topographer 1002 of any changes to the topography, which in turn updates 1420 the topography based on the changes and sends an acknowledgement 1422 to the analyzer 206.

Figure 15:
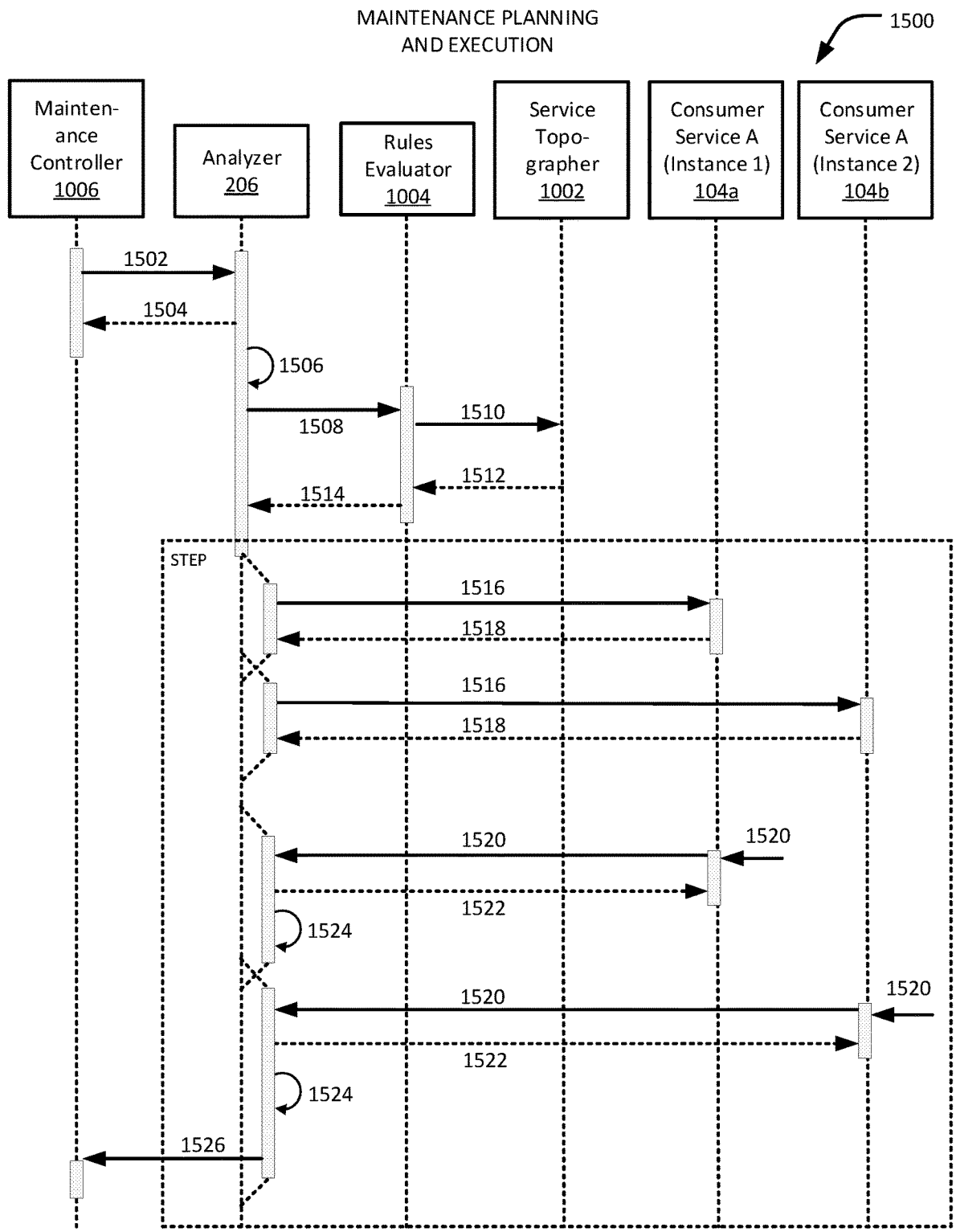
FIG. 15 is a data flow diagram of the coordinated microservice system of FIG. 1 during maintenance planning and execution, in accordance with an example of the present disclosure.

FIG. 15 is a data flow diagram 1500 of the coordinated microservice system of FIG. 1 during maintenance planning and execution, in accordance with an example of the present disclosure. In an example scenario, a command 1502 is issued, by the maintenance controller 1006, to execute a reboot on all instances of a deployed service following predefined availability rules. The analyzer 206 acknowledges 1504 the command 1502 and begins 1506 to create an execution plan for executing the command 1502. The analyzer 206 sends a request 1508 to evaluate the command 1502 against one or more predefined rules (e.g., rules that define when and under what conditions the command 1502 can be executed). For example, the predefined rules to determine whether a topographical change has occurred is stored as a logical implication (e.g., if the current status of a service is booting then add a new node to the topography object.) The rules evaluator 1004 sends a request 1510 to retrieve the current service topography to the service topographer 1002, which returns the current service topography 1512 to the rules evaluator 1004. In response, the rules evaluator 1004 generates one or more steps 1514 for executing the command 1502 and sends the plan steps 1514 to the analyzer 206.

Next, each step in the plan is executed. In this example, a reboot command 1516 is sent in parallel from the coordinator 102 to the first and second instances of the consumer service A 104a, 104b, which each send an acknowledgement 1518 back to the coordinator 102. However, it will be understood that each step in the execution plan can be different depending on the command, the topography, and the rules. For example, the command can be sent first to one instance of the service and then to another instance of the service after the first instance has completed execution of the command. In the example of FIG. 15, the command 1516 is a reboot command. After each instance 104a, 104b completes the reboot command, the instances each send a signal 1520 to the coordinator 102, which acknowledges 1522 receiving each signal 1520. The analyzer 206 then evaluates 1524 the success of the command 1502 against the predefined rules. If there are additional steps in the execution plan, those steps are executed in a similar manner. Otherwise, the analyzer 206 signals completion 1526 of the command 1502 to the maintenance controller 1006.

Adaptive Service Polling

Polling data from services is a common update mechanism for applications and services that support those applications. For example, an application may periodically poll a service to obtain price updates for products. However, polling can consume excessive resources. Due to the non-deterministic nature of system behavior, polling is usually set to the minimum period in which an update is likely or expected to occur. The system is then polled at the minimum period. For some systems, the polling frequency may vary depending on specific states and conditions that can only be determined dynamically. However, polling strictly at the minimum period may unnecessarily result in excessive waste because the polling frequency is not dynamically adapted in response to specific events or conditions, or changes to the conditions, due to the lack of feedback between the components that are polling, and other system service states that may modify the required update frequency.

To this end, in accordance with an example of the present disclosure, techniques are disclosed for dynamically adapting the polling frequency of a service based on feedback from other services. In this example, the coordinator 102 is configured to set and change the polling frequency of each service.

Figure 16:
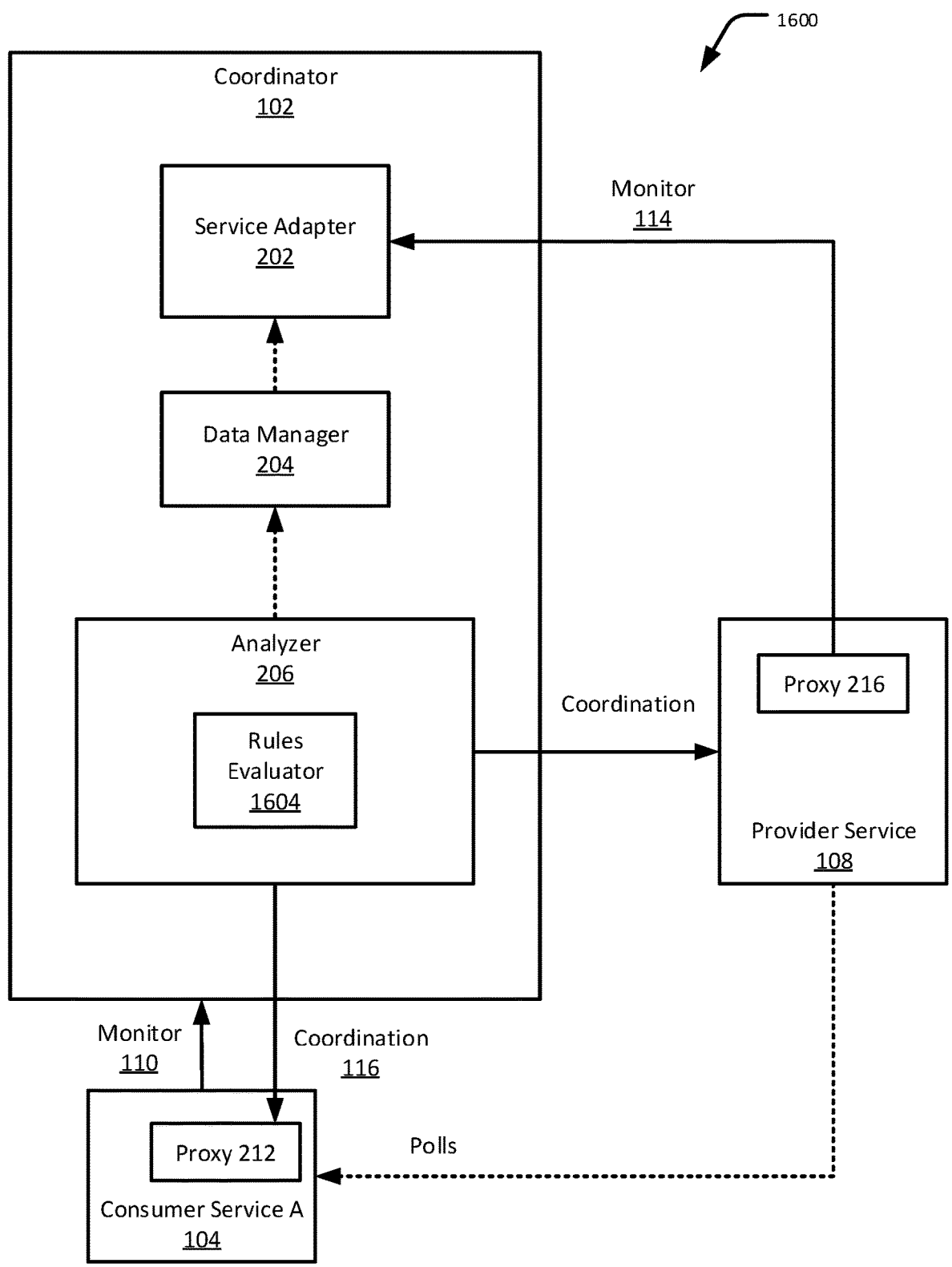
FIG. 16 is a block diagram of a coordinated microservice system, in accordance with an example of the present disclosure.

FIG. 16 is a block diagram of a coordinated microservice system 1600, in accordance with an example of the present disclosure. In this example, the analyzer 206 is configured to include a rules evaluator 1604. The analyzer 206 monitors data reported by a polled service (e.g., the consumer service A 104) and modifies the polling frequency of a polling service (a service that polls the polled service, such as the provider service 108). The polling frequency is based on a set of polling rules and the data gathered from the polled service by the data manager 204. The rules can be defined as settings loaded in the coordinator 102. The rules evaluator 1602 uses the rules to evaluate the data. The data can be collected from any business or infrastructure services. Once the analyzer 206 modifies the polling frequency, a message is sent to all or a subset of the polling services. The analyzer 206 uses the proxy 216 and a duplex connection to push the newly calculated polling frequency to the polling service. Once this new setting reaches the polling service, the polling service begins polling the polled service at the new polling frequency until the polling frequency is again changed.

Figure 17:
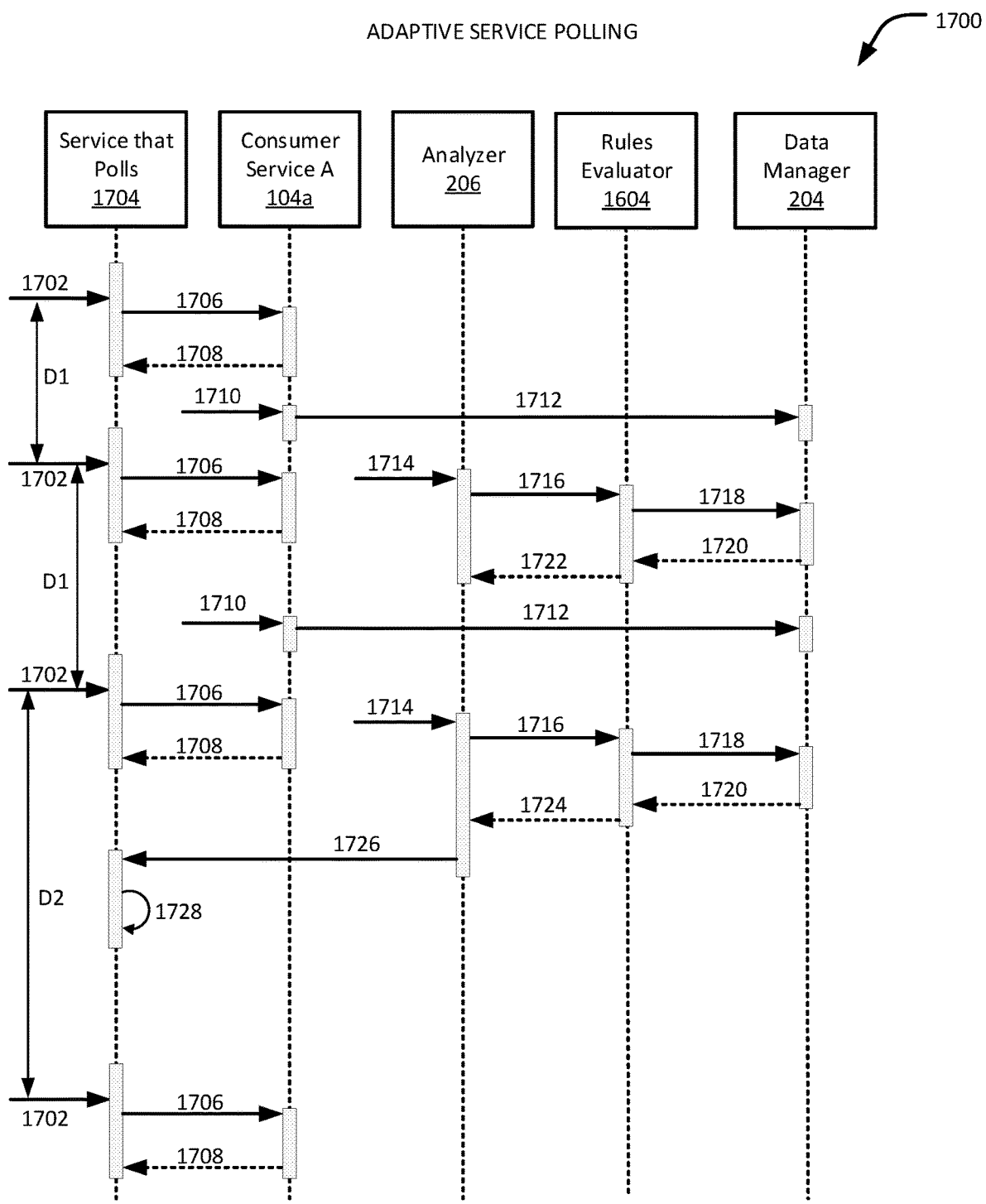
FIG. 17 is a data flow diagram of the coordinated microservice system of FIG. 1 during adaptive service polling, in accordance with an example of the present disclosure.

FIG. 17 is a data flow diagram 1700 of the coordinated microservice system of FIG. 1 during adaptive service polling, in accordance with an example of the present disclosure. In an example, a timed or periodic signal 1402 causes a service that polls 1704 to poll 1704 the consumer service A 104a. In response, the consumer service A 104a sends data 1708 to the service that polls 1704. This process of polling 1706 and sending data 1708 repeats at a first time interval D1. Periodically, a timed signal 1710 causes the consumer service A 104a to send metrics 1712 to the data manager 204. This regularly updates the status of the consumer service A 104a in the data manager 204, which is used by the analyzer 206 in subsequent stages. Periodically, a timed signal 1714 causes the analyzer 206 to request 1716 the rules evaluator 1604 to validate the metrics stored in the data manager 204 against one or more predefined polling rules. In response to the request 1716, the rules evaluator 1604 requests 1718 data for the consumer service A 104 as stored in the data manager 204, which returns the data 1720 to the rules evaluator 1604. If the rules evaluator 1704 does not validate the metrics (e.g., the metrics do not satisfy one or more of the predefined rules for changing the polling interval), then the rules evaluator 1604 signals 1722 to the analyzer 206 that the metrics are not valid for changing the polling interval. If, on the other hand, the rules evaluator 1704 validates the metrics (e.g., the metrics satisfy one or more of the predefined rules for changing the polling interval), then the rules evaluator 1604 signals 1724 to the analyzer 206 that the metrics are valid for changing the polling interval. In response to receiving the signal 1724, the analyzer 206 sends a request 1726 to the service that polls 1704 to change 1728 (update) the polling frequency from D1 to D2.

Figure 18:
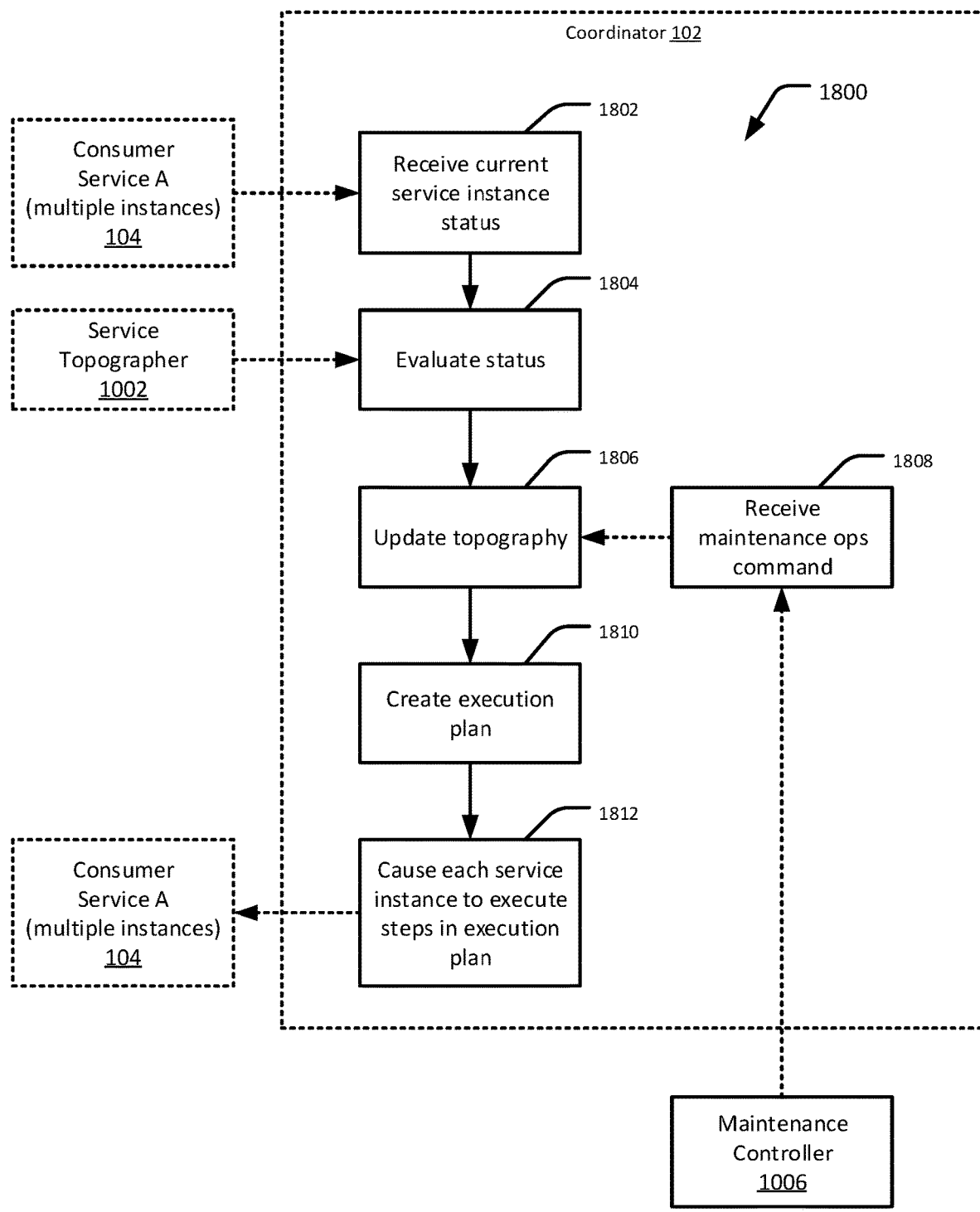
FIG. 18 is a flow diagram of an example service coordination process, in accordance with an example of the present disclosure.

FIG. 18 is a flow diagram of an example service coordination process 1800, in accordance with an example of the present disclosure. The process 1800 can be implemented, for example, by the coordinator 102 of the system 100 of FIG. 1. The process 1800 includes receiving 1802 a current status from an instance of the service in a topography. In response to receiving the current status, the process 1800 includes evaluating 1804 the current status against one or more rules to determine whether the current status changes the topography. In response to determining that the current status changes the topography, the process 1800 includes updating 1806 the topography based on the changes. The process 1800 further includes receiving 1808 a command to execute a maintenance operation on the service and creating 1810 an execution plan for executing the command based on one or more predefined rules and the updated topography. The execution plan includes one or more steps for executing the command on each instance of the service. The process 1800 further includes causing 1812 each of the one or more steps in the execution plan to be executed on each instance of the service in accordance with the one or more predefined rules.

In some examples, the current status is requested from an instance of the service in response to a timed or periodic signal. In some examples, the current status is requested from an instance of the service in response to a signal indicating that the topography has changed. In some examples, the current status is requested from an instance of the service at a polling frequency according to one or more predefined polling rules. In some examples, the polling frequency is modified based on the current status. In some examples, the one or more predefined polling rules define a plurality of service states, where each of the service states corresponds to different polling frequencies. For example, the command can include a reboot, a backup, or a software update.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of coordinating execution among multiple instances of a first service, the method comprising:
   receiving a current status from an instance of the first service in a topography;
   in response to receiving the current status, evaluating the current status against one or more rules to determine whether the current status changes the topography;
   in response to determining that the current status changes the topography, updating the topography based on the changes;
   receiving a command to execute a maintenance operation on the first service, wherein execution of the maintenance operation causes the first service to become at least temporarily unavailable to a second service that depends on the first service to perform a function;
   creating an execution plan for executing the command based on one or more predefined rules and the updated topography, the execution plan including one or more steps for delaying execution of the command on at least one instance of the first service at least until the first service is available to service the command without degrading performance of the second service; and
   causing each of the one or more steps in the execution plan to be executed on each instance of the service in accordance with the one or more predefined rules.

2. The method of claim 1, comprising requesting the current status in response to a timed or periodic signal.

3. The method of claim 1, comprising requesting the current status in response to a signal indicating that the topography has changed.

4. The method of claim 1, comprising requesting the current status at a polling frequency according to one or more predefined polling rules.

5. The method of claim 4, comprising modifying the polling frequency based on the current status.

6. The method of claim 4, wherein the one or more predefined polling rules define a plurality of service states, and wherein each of the service states corresponds to different polling frequencies.

7. The method of claim 1, wherein the command includes one or more of a reboot, a backup, and a software update.

8. A computer program product including one or more non-transitory machine-readable mediums having instructions encoded thereon that when executed by at least one processor cause a process to be carried out, the process comprising:
   receiving a current status from an instance of a first service in a topography;
   in response to receiving the current status, evaluating the current status against one or more rules to determine whether the current status changes the topography;
   in response to determining that the current status changes the topography, updating the topography based on the changes;
   receiving a command to execute a maintenance operation on the first service, wherein execution of the maintenance operation causes the first service to become at least temporarily unavailable to a second service that depends on the first service to perform a function;
   creating an execution plan for executing the command based on one or more predefined rules and the updated topography, the execution plan including one or more steps for delaying execution of the command on at least one instance of the first service at least until the first service is available to service the command without degrading performance of the second service; and
   causing each of the one or more steps in the execution plan to be executed on each instance of the service in accordance with the one or more predefined rules.

9. The computer program product of claim 8, wherein the process comprises requesting the current status in response to a timed or periodic signal.

10. The computer program product of claim 8, wherein the process comprises requesting the current status in response to a signal indicating that the topography has changed.

11. The computer program product of claim 8, wherein the process comprises requesting the current status at a polling frequency according to one or more predefined polling rules.

12. The computer program product of claim 11, wherein the process comprises modifying the polling frequency based on the current status.

13. The computer program product of claim 11, wherein the one or more predefined polling rules define a plurality of service states, and wherein each of the service states corresponds to different polling frequencies.

14. The computer program product of claim 8, wherein the command includes one or more of a reboot, a backup, and a software update.

15. A system comprising:
   a storage; and
   at least one processor operatively coupled to the storage, the at least one processor configured to execute instructions stored in the storage that when executed cause the at least one processor to carry out a process including
   receiving a current status from an instance of a first service in a topography;
   in response to receiving the current status, evaluating the current status against one or more rules to determine whether the current status changes the topography;
   in response to determining that the current status changes the topography, updating the topography based on the changes;
   receiving a command to execute a maintenance operation on the first service, wherein execution of the maintenance operation causes the first service to become at least temporarily unavailable to a second service that depends on the first service to perform a function;
   creating an execution plan for executing the command based on one or more predefined rules and the updated topography, the execution plan including one or more steps for delaying execution of the command on at least one instance of the first service at least until the first service is available to service the command without degrading performance of the second service; and
   causing each of the one or more steps in the execution plan to be executed on each instance of the service in accordance with the one or more predefined rules.

16. The system of claim 15, wherein the process comprises requesting the current status in response to a timed or periodic signal.

17. The system of claim 15, wherein the process comprises requesting the current status in response to a signal indicating that the topography has changed.

18. The system of claim 15, wherein the process comprises requesting the current status at a polling frequency according to one or more predefined polling rules.

19. The system of claim 18, wherein the process comprises modifying the polling frequency based on the current status.

20. The system of claim 18, wherein the one or more predefined polling rules define a plurality of service states, and wherein each of the service states corresponds to different polling frequencies.

* * * * *